US012165287B2

(12) United States Patent
Xu

(10) Patent No.: US 12,165,287 B2
(45) Date of Patent: Dec. 10, 2024

(54) SCT IMAGE GENERATION USING CYCLEGAN WITH DEFORMABLE LAYERS

(71) Applicant: Elekta, Inc., Atlanta, GA (US)

(72) Inventor: Jiaofeng Xu, Saint Louis, MO (US)

(73) Assignee: Elekta, Inc., Atlanta, GA (US)

(*) Notice: Subject to any disclaimer, the term of this patent is extended or adjusted under 35 U.S.C. 154(b) by 461 days.

(21) Appl. No.: 17/594,438

(22) PCT Filed: Jun. 27, 2019

(86) PCT No.: PCT/US2019/039538
§ 371 (c)(1),
(2) Date: Oct. 15, 2021

(87) PCT Pub. No.: WO2020/246996
PCT Pub. Date: Dec. 10, 2020

(65) Prior Publication Data
US 2022/0318956 A1    Oct. 6, 2022

Related U.S. Application Data

(60) Provisional application No. 62/858,156, filed on Jun. 6, 2019.

(51) Int. Cl.
*G06T 5/00* (2024.01)
*G06T 5/50* (2006.01)
(Continued)

(52) U.S. Cl.
CPC .................. *G06T 5/70* (2024.01); *G06T 5/50* (2013.01); *G06V 10/764* (2022.01);
(Continued)

(58) Field of Classification Search
CPC ... G06T 5/70; G06T 5/50; G06T 2207/10081; G06T 2207/20081; G06T 2207/20084;
(Continued)

(56) References Cited

U.S. PATENT DOCUMENTS

2018/0374245 A1   12/2018   Xu et al.
2019/0114818 A1   4/2019    Lin et al.

FOREIGN PATENT DOCUMENTS

AU   2019449137   3/2023
CN   114072845    2/2022
(Continued)

OTHER PUBLICATIONS

Liang et al., Generating Synthesized Computed Tomography (CT) from Cone-Beam Computed Tomography (CBCT) using CycleGAN for Adaptive Radiation Therapy, arXiv:1810.13350v2 (Year: 2018).*
(Continued)

*Primary Examiner* — Ping Y Hsieh
*Assistant Examiner* — Xiao Liu
(74) *Attorney, Agent, or Firm* — Schwegman Lundberg & Woessner, P.A.

(57) ABSTRACT

Techniques for generating a synthetic computed tomography (sCT) image from a cone-beam computed tomography (CBCT) image are provided. The techniques include receiving a CBCT image of a subject; generating, using a generative model, a sCT image corresponding to the CBCT image, the generative model trained based on one or more deformable offset layers in a generative adversarial network (GAN) to process the CBCT image as an input and provide the sCT image as an output; and generating a display of the sCT image for medical analysis of the subject.

20 Claims, 12 Drawing Sheets

(51) Int. Cl.
| | |
|---|---|
| *G06T 5/70* | (2024.01) |
| *G06V 10/764* | (2022.01) |
| *G06V 10/774* | (2022.01) |
| *G06V 10/776* | (2022.01) |
| *G06V 10/82* | (2022.01) |

(52) U.S. Cl.
CPC .......... *G06V 10/774* (2022.01); *G06V 10/776* (2022.01); *G06V 10/82* (2022.01); *G06T 2207/10081* (2013.01); *G06T 2207/20081* (2013.01); *G06T 2207/20084* (2013.01); *G06T 2207/30004* (2013.01)

(58) Field of Classification Search
CPC ......... G06T 2207/30004; G06T 11/008; G06T 2211/424; G06V 10/764; G06V 10/774; G06V 10/776; G06V 10/82
See application file for complete search history.

(56) References Cited

FOREIGN PATENT DOCUMENTS

| | | |
|---|---|---|
| JP | 7245364 | 3/2023 |
| WO | WO-2018048507 A1 | 3/2018 |
| WO | WO-2019005180 A1 | 1/2019 |
| WO | WO-2020246996 A1 | 12/2020 |

OTHER PUBLICATIONS

Wang et al, Unsupervised learning for cross-domain medical image synthesis using deformation invariant cycle consistency networks, arXiv:1808.03944v1 Aug. 12, 2018.*

"International Application Serial No. PCT US2019 039538, International Preliminary Report on Patentability mailed Dec. 16, 2021", 8 pgs.

"European Application Serial No. 19740461.9, Response to Communication pursuant to Rules 161 and 162 filed Jul. 18, 2022", 21 pgs.

"International Application Serial No. PCT/US2019/039538, International Search Report mailed Feb. 4, 2020", 5 pgs.

"International Application Serial No. PCT/US2019/039538, Written Opinion mailed Feb. 4, 2020", 9 pgs.

Dai, Jifeng, et al., "Deformable convolutional networks", Proceedings of the IEEE international conference on computer vision, (2017), 12 pgs.

Kida, S., et al., "Cone-beam CT to Planning CT synthesis using generative adversarial networks", arXiv preprint arXiv:1901.05773, (2019), 20 pgs.

Largent, Axel, et al., "Pseudo-CT Generation for Mri-only Radiotherapy: Comparative Study Between A Generative Adversarial Network, A U-Net Network, A Patch-Based, and an Atlas Based Methods", 2019 IEEE 16th International Symposium On Biomedical Imaging (ISBI 2019), IEEE XP033576402, (Apr. 8, 2019), 1109-1113.

Lei, Yang, et al., "MRI-based synthetic CT generation using deep convolutional neural network", Progress In Biomedical Optics And Imaging, Spie—International Society For Optical Engineering, Bellingham, WA, US, vol. 10949, XP060120530, (Mar. 15, 2019), 109492T-109492T.

Liang, Xiao, et al., "Generating Synthesized Computed Tomography (CT) from Cone-Beam Computed Tomography (CBCT) using CycleGAN for Adaptive Radiation Therapy", arXiv preprint arXiv:1810.13350, (2018), 14 pgs.

Xin, Yi, et al., "Generative Adversarial Network in Medical Imaging: A Review", Arxiv.Org, Cornell University Library, 201 Olin Library Cornell University Ithaca, NY 14853, XP081491720, (Sep. 19, 2018), 24 pgs.

Zhu, Jun-Yan, et al., "Unpaired Image-to-Image Translation using Cycle-Consistent Adversarial Networks", IEEE International Conference on Computer Vision, (2017), 10 pgs.

Zhu, Xizhou, et al., "Deformable convnets v2: More deformable, better results", arXiv preprint arXiv:1811.11168, (2018), 13 pgs.

"Australian Application Serial No. 2019449137, Response filed Feb. 3, 2023 to First Examination Report mailed Nov. 26, 2022", 12 pgs.

"Australian Application Serial No. 2019449137, First Examination Report mailed Nov. 26, 2022", 3 pgs.

"Japanese Application Serial No. 2021-572324, Notification of Reasons for Refusal mailed Nov. 8, 2022", w English translation, 10 pgs.

"Japanese Application Serial No. 2021-572324, Response filed Jan. 28, 2023 to Notification of Reasons for Refusal mailed Nov. 8, 2022", w English Claims, 18 pgs.

* cited by examiner

GENERATIVE ADVERSARIAL NETWORK (GAN)

SCT IMAGE GENERATION USING CYCLEGAN WITH DEFORMABLE LAYERS

CLAIM FOR PRIORITY

This application claims the benefit of priority to U.S. Provisional Application No. 62/858,156, filed Jun. 6, 2019, which is herein incorporated by reference in its entirety.

TECHNICAL FIELD

Embodiments of the present disclosure pertain generally to Cone-Beam Computed Tomography (CBCT) imaging, computed tomography imaging and artificial intelligence processing techniques. In particular, the present disclosure pertains to the generation and use of data models in generative adversarial networks (GANs) adapted for use with CBCT and computed tomography images and system operations.

BACKGROUND

X-ray cone-beam computed tomography (CBCT) imaging has been employed in radiation therapy for patient setup and adaptive re-planning. Under some circumstances, CBCT imaging has also been employed for diagnostic purposes, such as dental imaging and planning of implants. Moreover, X-ray CBCT imaging has been employed in many imaging-related applications, such as micro-computed tomography. However, the image quality of a CBCT image may be rather low, as observed by medical physicists, doctors, and researchers. In general, CBCT images may contain different types of artefacts (including various types of noise or visualized structure in the reconstructed data that is not present in the real object under investigation).

Artefacts and noise in CBCT images can sabotage adaptive treatment re-planning, affect diagnosis, or make many other image processing steps difficult or even impossible (such as image segmentation). Since each artefact can be caused by one or more different factors, different methods may be used to suppress different artefacts. For radiation therapy and other clinical applications, generally, besides CBCT images (which may be obtained daily), there may be one or more other computed tomography (CT) image datasets available together (such as the planning CT images). Generally, CT images have much higher image-quality with more accurate contrast or other information, and less artefacts. Although researchers have done many investigations and developed several related methods for the purpose of reducing artefacts in CBCT images, there is currently no existing simple and efficient method which can suppress all or most general artefacts. Therefore, there exists a significant need to develop a novel, efficient, and simple method to suppress and remove artefacts and noise in CBCT images.

OVERVIEW

The present disclosure includes procedures to develop, train, and utilize artificial intelligence (AI) processing techniques to generate simulated or synthetic CT (sCT) images that correspond or represent input CBCT images. Such AI processing techniques can include generative adversarial networks (GANs), cycle generative adversarial networks (CycleGANs), convolutional neural networks (CNNs), deep convolutional neural networks (DCNN), deformable convolutional network, deformable offset layers, spatial transformer networks, and other forms of machine learning (ML) implementations. The present disclosure specifically includes a number of illustrative examples relevant to the use of discriminator and generator models, operating within a GAN or CycleGAN, to learn a model of paired CBCT and real CT images to enhance and produce artefact-free or substantially artefact-free CBCT images or CBCT images with a substantially reduced number of artefacts. It will be apparent that the presently described use and analysis of imaging data (e.g., CBCT images) as part of a GAN or CycleGAN (and other disclosed AI and ML techniques) may be incorporated into other medical workflows used for a variety of diagnostic, evaluative, interpretative, or treatment settings.

In some embodiments, a method, system, and transitory or non-transitory computer readable medium are provided for generating a synthetic computed tomography (sCT) image from a cone-beam computed tomography (CBCT) image, the method comprising: receiving a CBCT image of a subject; generating, using a generative model, a sCT image corresponding to the CBCT image, the generative model trained based on one or more deformable offset layers in a generative adversarial network (GAN) to process the CBCT image as an input and provide the sCT image as an output; and generating a display of the sCT image for medical analysis of the subject.

In some implementations, the generative adversarial network is configured to train the generative model using a discriminative model; values applied by the generative model and the discriminative model are established using adversarial training between the discriminative model and the generative model; and the generative model and the discriminative model comprise respective convolutional neural networks.

In some implementations, the adversarial training comprises: training the generative model to generate a first sCT image from a given CBCT image by applying a first set of the one or more deformable offset layers to the given CBCT image; training the generative model to generate a second sCT image from the given CBCT image without applying the first set of the one or more deformable offset layers to the given CBCT image; and training the discriminative model to classify the first sCT image as a synthetic or a real computed tomography (CT) image, and the output of the generative model is used for training the discriminative model and an output of the discriminative model is used for training the generative model.

In some implementations, the GAN is trained using a cycle generative adversarial network (CycleGAN) comprising the generative model and the discriminative model, wherein the generative model is a first generative model and the discriminative model is a first discriminative model, wherein the CycleGAN further comprises: a second generative model trained to: process a given CT image as an input; provide a first synthetic (sCBCT) image as an output by applying a second set of the one or more deformable offset layers to the given CT image; and provide a second synthetic (sCBCT) image as an output without applying the second set of the one or more deformable offset layers to the given CT image; and a second discriminative model trained to classify the first synthetic sCBCT image as a synthetic or a real CBCT image.

In some implementations, the CycleGAN comprises a first portion to train the first generative model, wherein the first generative model includes first and second input interfaces and a first shared generator portion, wherein the second generative model includes third and fourth input interfaces and a second shared generator portion, the first portion being trained to: obtain a training CBCT image that is paired with a real CT image; transmit the training CBCT image to an input of the first generative model via first and second paths to output the first and second sCT images, respectively, the first path comprising the first input interface including the first set of the one or more deformable offset layers and a first set of one or more convolution layers, the second path comprising second input interface including the first set of the one or more convolution layers without the first set of the one or more deformable offset layers; receive the first sCT image at the input of the first discriminative model to classify the first sCT image as the synthetic or the real CT image; and receive the first and second sCT images at an input of the second generative model via third and fourth paths to generate first and second cycle CBCT images, respectively, for calculating cycle-consistency losses, the third path comprising the third input interface including a second set of the one or more deformable offset layers and a second set of the one or more convolution layers, the fourth path comprising the fourth input interface including the second set of the one or more convolution layers without the second set of the one or more deformable offset layers.

In some implementations, the CycleGAN comprises a second portion that is trained to: transmit the real CT image to the input of the second generative model via fifth and sixth paths to output first and second synthetic CBCT images, respectively, the fifth path comprising third input interface including the second set of the one or more deformable offset layers and the second set of the one or more convolution layers, the sixth path comprising fourth input interface including the second set of the one or more convolution layers without the second set of the one or more deformable offset layers; receive the first synthetic CBCT image at the input of the second discriminative model to classify the first synthetic CBCT image as a synthetic or real CBCT image; and receive the first and second synthetic CBCT images at the input of the first generative modal via seventh and eighth paths to generate first and second cycle CT images for calculating cycle-consistency losses, the seventh path comprising the first input interface including the first set of the one or more deformable offset layers and the first set of the one or more convolution layers, the eighth path comprising the second input interface including the first set of the one or more convolution layers without the first set of the one or more deformable offset layers.

In some implementations, the cycle-consistency losses being generated based on a comparison of the first and second cycle CBCT images with the training CBCT image and a comparison of the first and second cycle CT images with the real CT image; the first generative model is trained to minimize or reduce a first pixel-based loss term using the second sCT image, the first pixel-based loss term represents an expectation of difference between a plurality of synthetic CT images and respectively paired real CT images; and the second generative model is trained to minimize or reduce a second pixel-based loss term using the second synthetic (sCBCT) image, the second pixel-based loss term representing an expectation of difference between a plurality of synthetic CBCT images and respectively paired real CBCT images.

In some implementations, the CycleGAN is trained to apply a metric to the first and second pixel-based loss terms, the metric generated based on a map having a same size as a pair of a CBCT images and real CT images, such that each pixel value in the map represents a similarity level between a given CBCT image and a given real CT image that is paired with the given CBCT image; and the CycleGAN is trained to apply a threshold to the metric such that when the similarity level exceeds the threshold, the metric is applied to the first and second pixel-based loss terms and otherwise a zero value is applied to the first and second pixel-based loss terms.

In some implementations, the CycleGAN is trained to apply one of a plurality of metrics to the first and second pixel-based loss terms, the metrics being generated using low-pass filtering and down-sampling of the paired CBCT and CT images at different image resolutions or view levels.

In some implementations, the one or more deformable offset layers are trained based on the adversarial training to change a sampling amount, introduce coordinate offsets, and resample images using interpolation in order store or absorb deformed structure information between the paired CBCT and CT images.

In some embodiments, a method, system, and transitory or non-transitory computer readable medium are provided for training a model to generate a synthetic computed tomography (sCT) image from a cone-beam computed tomography (CBCT) image, comprising: receiving a CBCT image of a subject as an input of a generative model; and training the generative model, via first and second paths, in a generative adversarial network (GAN) to process the CBCT image to provide first and second synthetic computed tomography (sCT) images corresponding to the CBCT image as outputs of the generative model, the first path comprising a first set of one or more deformable offset layers and a first set of one or more convolution layers, the second path comprising the first set of the one or more convolution layers without the first set of the one or more deformable offset layers.

In some implementations, the GAN is trained using a cycle generative adversarial network (CycleGAN) comprising the generative model and a discriminative model, wherein the generative model is a first generative model and the discriminative model is a first discriminative model, further comprising: training a second generative model to process produced first and second sCT images as inputs and provide first and second cycle-CBCT images as outputs via third and fourth paths, respectively, the third path comprising a second set of the one or more deformable offset layers and a second set of the one or more convolution layers, the fourth path comprising the second set of the one or more convolution layers without the second set of the one or more deformable offset layers; and training a second discriminative model to classify the first cycle-CBCT image as a synthetic or a real CBCT image.

In some implementations, the CycleGAN comprises first and second portions to train the first generative model, further comprising: obtaining a training CBCT image that is paired with a real CT image; transmitting the training CBCT image to the input of the first generative model via the first and second paths to output the first and second synthetic CT images; receiving the first synthetic CT image at the input of the first discriminative model; classifying, with the first discriminative model, the first synthetic CT image as a synthetic or real CT image; receiving the first and second synthetic CT images at the input of the second generative model via the third and fourth paths to generate the first and second cycle CBCT images for calculating cycle-consistency losses; transmitting the real CT image to the input of the second generative model via the fifth and sixth paths to output the first and second synthetic training CBCT images, the fifth path comprising the second set of the one or more deformable offset layers and the second set of the one or more convolution layers, the fourth path comprising the second set of the one or more convolution layers without the second set of the one or more deformable offset layers; receiving the first synthetic training CBCT image at the input of the second discriminative model; classifying, with the second discriminative model, the first synthetic training CBCT image as a synthetic or real CBCT image; receiving the first and second synthetic CBCT images at the input of the first generative model, via seventh and eighth paths, to generate first and second cycle CT images for calculating cycle-consistency losses, the seventh path comprising the first set of the one or more deformable offset layers and the first set of the one or more convolution layers, the eighth path comprising the first set of the one or more convolution layers without the first set of the one or more deformable offset layers; training the first generative model to minimize or reduce a first pixel-based loss term using the second sCT image, the first pixel-based loss term representing an expectation of a difference between a plurality of synthetic CT images and respectively paired real CT images; and training the second generative model to minimize or reduce a second pixel-based loss using the second synthetic (sCBCT) image, the second pixel-based loss term representing an expectation of a difference between a plurality of synthetic CBCT images and respectively paired real CBCT images.

The above overview is intended to provide an overview of subject matter of the present patent application. It is not intended to provide an exclusive or exhaustive explanation of the inventive subject matter. The detailed description is included to provide further information about the present patent application.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example but not by way of limitation, various embodiments discussed in the present document.

DETAILED DESCRIPTION

Figure 1:
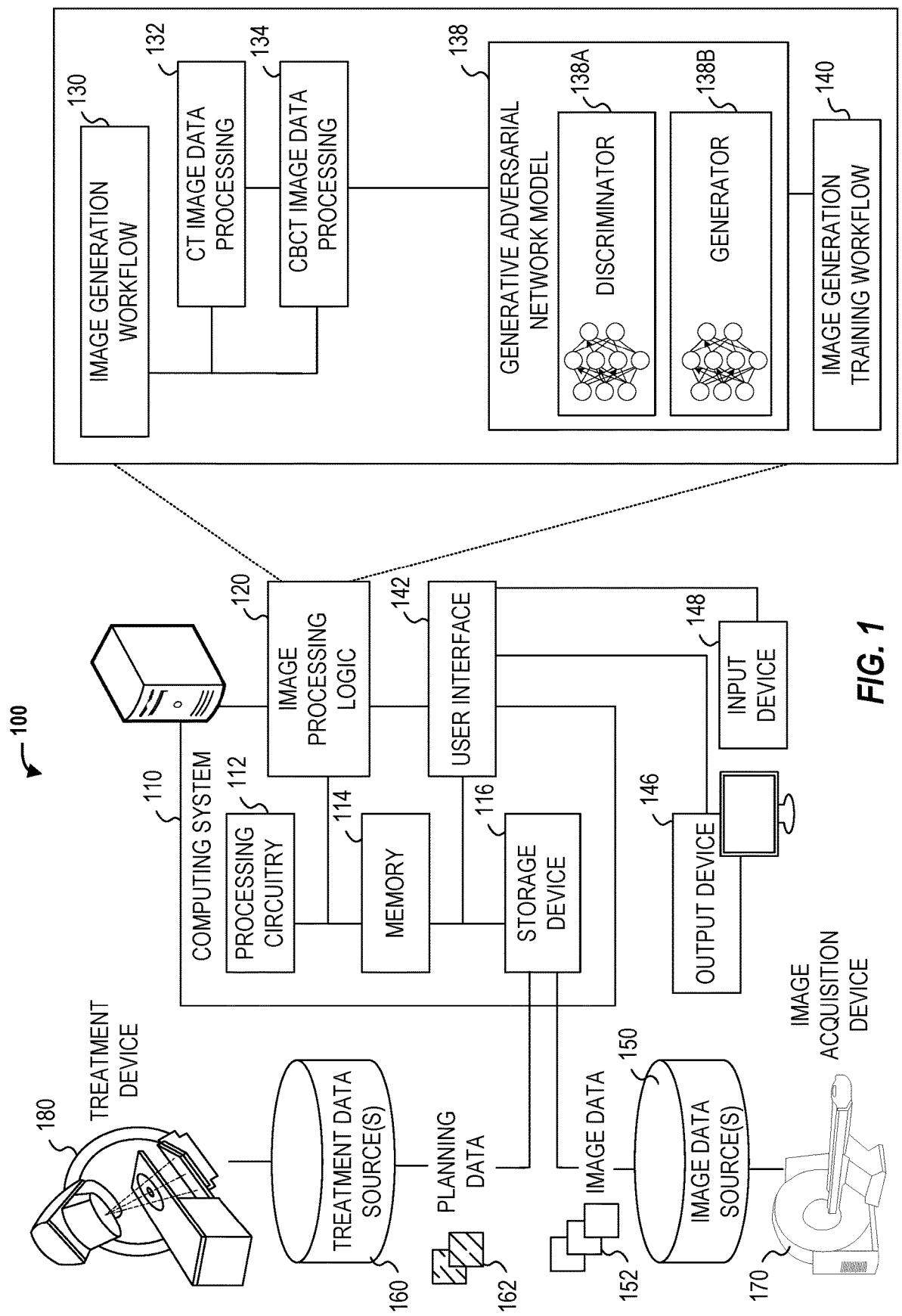
FIG. 1 illustrates an exemplary radiotherapy system adapted for performing treatment plan generation processing according to some examples.

The present disclosure includes various techniques to improve and enhance CBCT imaging by generating sCT images (synthetic or simulated CT images that represent a received CBCT image), including in a manner that provides technical benefits over manual (e.g., human-directed, -assisted or -guided) and conventional approaches for improving CBCT images. These technical benefits include reduced computing processing times to generate enhanced CBCT images or sCT images, removal of artefacts in CBCT images, and enhanced CBCT images, as well as accompanying improvements in processing, memory, and network resources used to generate and enhance CBCT images and sCT images. These improved CBCT images or sCT images may be applicable to a variety of medical treatment and diagnostic settings and the information technology systems used in such settings, in addition to the improvement in data management, visualization, and control systems that manage data to support such improved CBCT images or sCT images. Accordingly, in addition to these technical benefits, the present techniques may also result in many apparent medical treatment benefits (including improved accuracy of radiotherapy treatment, reduced exposure to unintended radiation, and the like).

As further discussed herein, the following uses and deployments of a generative adversarial network (GAN), a form of supervised artificial intelligence (AI) machine learning, enable an improvement in the accuracy and usefulness of a CBCT image by generating a sCT image through a learned model. In an example, the present techniques output a synthetic CT image that corresponds to an input CBCT image (e.g., of a human subject) and can include pixel values having an accuracy matching or comparable to real, true, or actual CT imaging data (such CT images may be referred to throughout as real, true, or actual CT images). The learned models discussed herein may also produce a synthetic CT image (sCT) with superior high-image quality from an original low image-quality CBCT image. Such sCT images preserve anatomy structures in the original CBCT images and may remove or eliminate all or substantially all scattering, streaking artefacts, and other noise artefacts to obtain high image quality with accurate and correct HU values. The sCT images can be produced on the fly in real time (e.g., the disclosed model can generate and enhance CBCT images as they are received).

In an example, the learned models are produced using a pair of deep convolutional neural networks operating in a GAN or CycleGAN: a generator (also referred to as a "generative model") that produces estimates of the probability distribution describing the training data; and a discriminator (also referred to as a "discriminative model") that classifies generator samples as belonging to the generator or to the training data. The generator aims to emulate the data distribution of the training data as completely as possible, and thereby maximally confuse the discriminator. As a result, a generator is produced that is trained (in essence, "tuned") to maximize the results of regression in predictive modeling.

In an example, the GAN is trained on paired sets of CBCT images and real CT images, to train the model to generate a sCT image given a CBCT image. The CBCT images may be registered with the real CT images. A GAN two-network (generator-discriminator) architecture may be used to produce a trained generative model that generates sCT images corresponding to received CBCT images that are superior to previous implementations, including prior approaches of supervised ML in neural networks and CycleGANs. These and a variety of other technological and functional benefits will be apparent from the following sections.

Particularly, the disclosed techniques train the GAN by applying deformable offset layers to CBCT or CT images in one generator model training path and without applying the deformable offset layers in a second generator model training path. The discriminator in the disclosed techniques is trained to only operate on the output of the generator to which the deformable offset layers were applied. Cycle-consistence loss terms are used to train the generator model based on the images generated in both generator paths. In this way, adversarial loses, which introduce some amount of artificial anatomy structures or deformed anatomy structures, are only applied to the deformed image output of the generators. This limits the influence of the adversarial losses of the artificial anatomy structures or deformed anatomy structures in training the generator, which improves the sCT images produced by the generator. Namely, the effect of potentially learning unwanted structure information and potentially producing hallucinated artificial structures caused by adversarial loss is decoupled from the effect of preserving original structures caused by cycle-consistence loss terms. By minimizing the "cycle-consistence" loss terms, the sCT images produced by the generator without offset layers preserve all true anatomy structures existing in original CBCT images. Meanwhile, because "adversarial" loss is placed only on the images produced based on the deformable offset layers, such offset layers accommodate all unwanted shape deformation or potential produced hallucinated structures.

The approaches discussed herein enable the discovery of the properties of CBCT images and real CT images to generate new sCT images in real time as CBCT images are received. These approaches use a kind of statistical learning employed by GANs to obtain a much more detailed model of the linkages between CBCT images and real CT images.

One approach has explored use of CycleGANs for generating sCT images from CBCT images. Such an approach is discussed in co-pending, commonly assigned Jiaofeng Xu et al., U.S. patent application Ser. No. 16/044,245, filed Jul. 24, 2018, entitled "CONE-BEAM CT IMAGE ENHANCEMENT USING GENERATIVE ADVERSARIAL NETWORKS", which is hereby incorporated by reference in its entirety. That approach combined a CycleGAN weighted L1-loss terms based on paired CBCT-CT data. Particularly, that approach added an L1-loss term between sCT images and real CT images and between synthetic CBCT images and true CBCT images and compensated for imperfect matching using weighted pixel-based terms. That approach works well for generating sCT images for cases in which the shape distributions of CBCT and CT images are similar or are not dramatically different. However, when the shape distribution or other feature distribution in CT images have a large amount of differences compared to the original CBCT images, the "adversarial losses" can introduce some artificial anatomy structures or some deformed anatomy structures in sCT images which can cause unexpected results in the produced sCT images. This is because the generator in that approach is trained based on the adversarial losses to learn unexpected shape deformation for certain areas.

Specifically, the fundamental issue of the previous approach is that all those loss terms function to train the same generator. As such, the same generator is trained to achieve multiple different purposes, where in some cases the same generator cannot achieve all such purposes in an optimal way. For example, the single generator is trained to convert the CBCT image appearance to CT image in a way that removes artefacts in original CBCT images and converts to the correct CT numbers while, at the same time, being trained based on some level of structure deformation. When the shape distribution or other feature distribution in CT images domain have large amount of differences compared to the original CBCT images domain, this unwanted structure deformation or other deformation may fail to be suppressed, resulting in such unwanted structure deformation or other artificial structures being present in the produced sCT images.

Conventional systems have not explored ways of improving the operation and accuracy of a CycleGAN which decouple the effect of potentially learning unwanted structure information and potentially producing hallucinated artificial structures caused by adversarial loss from the effect of preserving original structures caused by cycle-consistence loss terms. Particularly, conventional systems have not explored ways to train in parallel or simultaneously generators to generate sCT images in multiple paths and only apply adversarial losses to images produced in one of the paths to which deformable offset layers have been applied.

FIG. 1 illustrates an exemplary radiotherapy system 100 adapted to perform radiotherapy plan processing operations using one or more of the approaches discussed herein. These radiotherapy plan processing operations are performed to enable the radiotherapy system 100 to provide radiation therapy to a patient based on specific aspects of captured medical imaging data and therapy dose calculations. Specifically, the following processing operations may be implemented as part of an image generation workflow 130 and an image generation training workflow 140, implemented by image processing logic 120. It will be understood, however, that many variations and use cases of the following trained models and image processing logic 120 may be provided, including in data verification, visualization, and other medical evaluative and diagnostic settings. Radiotherapy system 100 may use a GAN to generate sCT images from a received CBCT image. The sCT image may represent an improved CBCT image with sharp-edge looking features that are akin to real CT images. Radiotherapy system 100 may thus produce sCT type of images for medical analysis in real time using lower quality CBCT images that are captured of a region of a subject.

The radiotherapy system 100 includes a radiotherapy processing computing system 110 which hosts image processing logic 120. The radiotherapy processing computing system 110 may be connected to a network (not shown), and such network may be connected to the Internet. For instance, a network can connect the radiotherapy processing computing system 110 with one or more medical information sources (e.g., a radiology information system (RIS), a medical record system (e.g., an electronic medical record (EMR)/electronic health record (EHR) system), an oncology information system (OIS)), one or more image data sources 150, an image acquisition device 170 (e.g., an imaging modality), a treatment device 180 (e.g., a radiation therapy device), and a treatment data source 160. As an example, the radiotherapy processing computing system 110 can be configured to receive a CBCT image of a subject and generate a sCT image that corresponds to the CBCT image by executing instructions or data from the image processing logic 120, as part of operations to generate improved CBCT images to be used by the treatment device 180 and/or for output on device 146.

The radiotherapy processing computing system 110 may include processing circuitry 112, memory 114, a storage device 116, and other hardware and software-operable features such as a user interface 142, a communication interface (not shown), and the like. The storage device 116 may store transitory or non-transitory computer-executable instructions, such as an operating system, radiation therapy treatment plans (e.g., training CBCT images, real CT images, pairing information that associates the training and real CT images, generated sCT images, adapted or modified CBCT images, and the like), software programs (e.g., image processing software, image or anatomical visualization software, AI implementations and algorithms such as provided by DL models, ML models, and neural networks, etc.), and any other computer-executable instructions to be executed by the processing circuitry 112.

In an example, the processing circuitry 112 may include a processing device, such as one or more general-purpose processing devices such as a microprocessor, a central processing unit (CPU), a graphics processing unit (GPU), an accelerated processing unit (APU), or the like. More particularly, the processing circuitry 112 may be a complex instruction set computing (CISC) microprocessor, a reduced instruction set computing (RISC) microprocessor, a very long instruction Word (VLIW) microprocessor, a processor implementing other instruction sets, or processors implementing a combination of instruction sets. The processing circuitry 112 may also be implemented by one or more special-purpose processing devices such as an application specific integrated circuit (ASIC), a field programmable gate array (FPGA), a digital signal processor (DSP), a System on a Chip (SoC), or the like. As would be appreciated by those skilled in the art, in some examples, the processing circuitry 112 may be a special-purpose processor, rather than a general-purpose processor. The processing circuitry 112 may include one or more known processing devices, such as a microprocessor from the Pentium™, Core™, Xeon™, or Itanium® family manufactured by Intel™, the Turion™, Athlon™, Sempron™ Opteron™, FX™, Phenom™ family manufactured by AMD™, or any of various processors manufactured by Sun Microsystems. The processing circuitry 112 may also include graphical processing units such as a GPU from the GeForce®, Quadro®, Tesla® family manufactured by Nvidia™, GMA, Iris™ family manufactured by Intel™, or the Radeon™ family manufactured by AMD™. The processing circuitry 112 may also include accelerated processing units such as the Xeon Phi™ family manufactured by Intel™. The disclosed embodiments are not limited to any type of processor(s) otherwise configured to meet the computing demands of identifying, analyzing, maintaining, generating, and/or providing large amounts of data or manipulating such data to perform the methods disclosed herein. In addition, the term "processor" may include more than one physical (circuitry based) or software-based processor, for example, a multi-core design or a plurality of processors each having a multi-core design. The processing circuitry 112 can execute sequences of transitory or non-transitory computer program instructions, stored in memory 114, and accessed from the storage device 116, to perform various operations, processes, methods that will be explained in greater detail below. It should be understood that any component in system 100 may be implemented separately and operate as an independent device and may be coupled to any other component in system 100 to perform the techniques described in this disclosure.

The memory 114 may comprise read-only memory (ROM), a phase-change random access memory (PRAM), a static random access memory (SRAM), a flash memory, a random access memory (RAM), a dynamic random access memory (DRAM) such as synchronous DRAM (SDRAM), an electrically erasable programmable read-only memory (EEPROM), a static memory (e.g., flash memory, flash disk, static random access memory) as well as other types of random access memories, a cache, a register, a compact disc read-only memory (CD-ROM), a digital versatile disc (DVD) or other optical storage, a cassette tape, other magnetic storage device, or any other non-transitory medium that may be used to store information including image, data, or transitory or non-transitory computer executable instructions (e.g., stored in any format) capable of being accessed by the processing circuitry 112, or any other type of computer device. For instance, the computer program instructions can be accessed by the processing circuitry 112, read from the ROM, or any other suitable memory location, and loaded into the RAM for execution by the processing circuitry 112.

The storage device 116 may constitute a drive unit that includes a transitory or non-transitory machine-readable medium on which is stored one or more sets of transitory or non-transitory instructions and data structures (e.g., software) embodying or utilized by any one or more of the methodologies or functions described herein (including, in various examples, the image processing logic 120 and the user interface 142). The instructions may also reside, completely or at least partially, within the memory 114 and/or within the processing circuitry 112 during execution thereof by the radiotherapy processing computing system 110, with the memory 114 and the processing circuitry 112 also constituting transitory or non-transitory machine-readable media.

The memory 114 and the storage device 116 may constitute a non-transitory computer-readable medium. For example, the memory 114 and the storage device 116 may store or load transitory or non-transitory instructions for one or more software applications on the computer-readable medium. Software applications stored or loaded with the memory 114 and the storage device 116 may include, for example, an operating system for common computer systems as well as for software-controlled devices. The radiotherapy processing computing system 110 may also operate a variety of software programs comprising software code for implementing the image processing logic 120 and the user interface 142. Further, the memory 114 and the storage device 116 may store or load an entire software application, part of a software application, or code or data that is associated with a software application, which is executable by the processing circuitry 112. In a further example, the memory 114 and the storage device 116 may store, load, and manipulate one or more radiation therapy treatment plans, imaging data, segmentation data, treatment visualizations, histograms or measurements, AI model data (e.g., weights and parameters), labels and mapping data, and the like. It is contemplated that software programs may be stored not only on the storage device 116 and the memory 114 but also on a removable computer medium, such as a hard drive, a computer disk, a CD-ROM, a DVD, a Blu-Ray DVD, USB flash drive, a SD card, a memory stick, or any other suitable medium; such software programs may also be communicated or received over a network.

Although not depicted, the radiotherapy processing computing system 110 may include a communication interface, network interface card, and communications circuitry. An example communication interface may include, for example, a network adaptor, a cable connector, a serial connector, a USB connector, a parallel connector, a high-speed data transmission adaptor (e.g., such as fiber, USB 3.0, thunderbolt, and the like), a wireless network adaptor (e.g., such as a IEEE 802.11/Wi-Fi adapter), a telecommunication adapter (e.g., to communicate with 3G, 4G/LTE, and 5G, networks and the like), and the like. Such a communication interface may include one or more digital and/or analog communication devices that permit a machine to communicate with other machines and devices, such as remotely located components, via a network. The network may provide the functionality of a local area network (LAN), a wireless network, a cloud computing environment (e.g., software as a service, platform as a service, infrastructure as a service, etc.), a client-server, a wide area network (WAN), and the like. For example, network may be a LAN or a WAN that may include other systems (including additional image processing computing systems or image-based components associated with medical imaging or radiotherapy operations).

In an example, the radiotherapy processing computing system 110 may obtain image data 152 from the image data source 150 (e.g., CBCT images), for hosting on the storage device 116 and the memory 114. An exemplary image data source 150 is described in detail in connection with FIG. 2B. In an example, the software programs operating on the radiotherapy processing computing system 110 may convert medical images of one format (e.g., MRI) to another format (e.g., CT), such as by producing synthetic images, such as a pseudo-CT image or an sCT image. In another example, the software programs may register or associate a patient medical image (e.g., a CT image or an MR image) with that patient's CBCT image subsequently created or captured (e.g., also represented as an image) so that corresponding images are appropriately paired and associated. In yet another example, the software programs may substitute functions of the patient images such as signed distance functions or processed versions of the images that emphasize some aspect of the image information.

In an example, the radiotherapy processing computing system 110 may obtain or communicate CBCT imaging data 152 from or to image data source 150. Such imaging data may be provided to computing system 110 to enhance or improve the imaging data using GAN or CycleGAN modeling to produce an sCT image. The sCT image may be used by treatment data source 160 or device 180 to treat a human subject. In further examples, the treatment data source 160 receives or updates the planning data as a result of an sCT image generated by the image generation workflow 130; the image data source 150 may also provide or host the imaging data 152 for use in the image generation training workflow 140.

In an example, computing system 110 may generate pairs of CBCT and real CT images using image data source 150. For example, computing system 110 may instruct a CBCT device to obtain an image of a target region of a subject (e.g., a brain region). Computing system 110 may store the image data in storage device 116 with an associated indication of a time and target region captured by the CBCT image. Computing system 110 may also instruct a CT imaging device to obtain an image of the same target region (e.g., the same cross section of the brain region) as a real CT image. Computing system 110 may associate the real CT image with the previously obtained CBCT image of the same region, thus forming a pair of real CT and CBCT images for storage in device 116 as a training pair. Computing system 110 may continue generating such pairs of training images until a threshold number of pairs are obtained. In some implementations, computing system 110 may be guided by a human operator as to which target region to obtain and which CBCT images are paired with the real CT images.

The processing circuitry 112 may be communicatively coupled to the memory 114 and the storage device 116, and the processing circuitry 112 may be configured to execute computer-executable instructions stored thereon from either the memory 114 or the storage device 116. The processing circuitry 112 may execute instructions to cause medical images from the image data 152 to be received or obtained in memory 114 and processed using the image processing logic 120. In further examples, the processing circuitry 112 may utilize software programs (e.g., image processing software) along with the image data 152 and other patient data to enhance or generate sCT images.

In addition, the processing circuitry 112 may utilize software programs to generate intermediate data such as updated parameters to be used, for example, by a neural network model, machine learning model, image generation workflow 130, image generation training workflow 140, or other aspects involved with generation of an sCT image with a GAN or CycleGAN as discussed herein. Further, such software programs may utilize the image processing logic 120 to implement the image generation workflow 130 to produce new or updated sCT images for deployment to the treatment data source 160 and/or presentation on output device 146, using the techniques further discussed herein. The processing circuitry 112 may subsequently then transmit the new or updated images via a communication interface and the network to the treatment device 180, where the radiation therapy plan will be used to treat a patient with radiation via the treatment device 180, consistent with results of the workflow 130 as trained with the workflow 140. Other outputs and uses of the software programs and the workflows 130, 140 may occur with use of the radiotherapy processing computing system 110.

In the examples herein (e.g., with reference to the generative adversarial network processing discussed with reference to FIGS. 3 and 4), the processing circuitry 112 may execute software programs that invoke the image processing logic 120 to implement functions of ML, DL, neural networks, and other aspects of artificial intelligence for sCT image generation from an input CBCT image. For instance, the processing circuitry 112 may execute software programs that train, analyze, predict, evaluate, and generate an sCT image from a received CBCT image, as discussed herein. According to the disclosed embodiments, the generator of the sCT image is trained via multiple paths in which a first path includes one or more deformable offset layers and one or more convolution layers and a second path includes the one or more convolution layers without the one or more deformable offset layers. Specifically, the generator is trained by executing two parallel or sequential processes in which one process generates a first sCT image from a training CBCT image via the first path and the second process generates a second sCT image from the training CBCT image via the second path. The first sCT image is provided to train a first discriminator to discriminate whether the first sCT image is a real CT image or a synthetic CT image. Then the first and second sCT images are provided to another generator to generate CBCT images to provide first and second cycle CBCT images for training based on a cycle-consistence loss term using the training CBCT image. In this way, the effects of learning unwanted structure deformation and potentially producing hallucinated structures caused by the adversarial loss term training is decoupled from the effect of preserving original structures caused by the cycle-consistence loss term. Another portion of the CycleGAN trains the same generators in a similar way based on the paired CT images of the training CBCT image that is used utilizing two separate paths—one with deformable offset layers and one or more convolution layers and another with the one or more convolution layers and without the deformable offset layers.

In an example, the image data 152 may include one or more MRI image (e.g., 2D MRI, 3D MRI, 2D streaming MRI, 4D MRI, 4D volumetric Mill, 4D cine MRI, etc.), functional MRI images (e.g., fMRI, DCE-MRI, diffusion MRI), Computed Tomography (CT) images (e.g., 2D CT, 2D Cone beam CT, 3D CT, 3D CBCT, 4D CT, 4DCBCT), ultrasound images (e.g., 2D ultrasound, 3D ultrasound, 4D ultrasound), Positron Emission Tomography (PET) images, X-ray images, fluoroscopic images, radiotherapy portal images, Single-Photo Emission Computed Tomography (SPECT) images, computer generated synthetic images (e.g., pseudo-CT images) and the like. Further, the image data 152 may also include or be associated with medical image processing data, for instance, training images, ground truth images, contoured images, and dose images. In other examples, an equivalent representation of an anatomical area may be represented in non-image formats (e.g., coordinates, mappings, etc.).

In an example, the image data 152 may be received from the image acquisition device 170 and stored in one or more of the image data sources 150 (e.g., a Picture Archiving and Communication System (PACS), a Vendor Neutral Archive (VNA), a medical record or information system, a data warehouse, etc.). Accordingly, the image acquisition device 170 may comprise a MRI imaging device, a CT imaging device, a PET imaging device, an ultrasound imaging device, a fluoroscopic device, a SPECT imaging device, an integrated Linear Accelerator and MRI imaging device, CBCT imaging device, or other medical imaging devices for obtaining the medical images of the patient. The image data 152 may be received and stored in any type of data or any type of format (e.g., in a Digital Imaging and Communications in Medicine (DICOM) format) that the image acquisition device 170 and the radiotherapy processing computing system 110 may use to perform operations consistent with the disclosed embodiments. Further, in some examples, the models discussed herein may be trained to process the original image data format or a derivation thereof.

In an example, the image acquisition device 170 may be integrated with the treatment device 180 as a single apparatus (e.g., a MRI device combined with a linear accelerator, also referred to as an "MRI-Linac"). Such an MRI-Linac can be used, for example, to determine a location of a target organ or a target tumor in the patient, so as to direct radiation therapy accurately according to the radiation therapy treatment plan to a predetermined target. For instance, a radiation therapy treatment plan may provide information about a particular radiation dose to be applied to each patient. The radiation therapy treatment plan may also include other radiotherapy information, such as beam angles, dose-histogram-volume information, the number of radiation beams to be used during therapy, the dose per beam, and the like. In some examples, the GAN-trained models in the image generation workflow 130 are used only to generate an enhanced CBCT image, and other workflows or logic (not shown) are used to translate this enhanced CBCT image into the specific beam angles and radiation physics used to accomplish the radiotherapy treatment.

The radiotherapy processing computing system 110 may communicate with an external database through a network to send/receive a plurality of various types of data related to image processing and radiotherapy operations. For example, an external database may include machine data (including device constraints) that provides information associated with the treatment device 180, the image acquisition device 170, or other machines relevant to radiotherapy or medical procedures. Machine data information may include radiation beam size, arc placement, beam on and off time duration, machine parameters, segments, multi-leaf collimator (MLC) configuration, gantry speed, MRI pulse sequence, and the like. The external database may be a storage device and may be equipped with appropriate database administration software programs. Further, such databases or data sources may include a plurality of devices or systems located either in a central or a distributed manner.

The radiotherapy processing computing system 110 can collect and obtain data, and communicate with other systems, via a network using one or more communication interfaces, which are communicatively coupled to the processing circuitry 112 and the memory 114. For instance, a communication interface may provide communication connections between the radiotherapy processing computing system 110 and radiotherapy system components (e.g., permitting the exchange of data with external devices). For instance, the communication interface may, in some examples, have appropriate interfacing circuitry from an output device 146 or an input device 148 to connect to the user interface 142, which may be a hardware keyboard, a keypad, or a touch screen through which a user may input information into the radiotherapy system 100.

As an example, the output device 146 may include a display device that outputs a representation of the user interface 142 and one or more aspects, visualizations, or representations of the medical images, the treatment plans, and statuses of training, generation, verification, or implementation of such plans. The output device 146 may include one or more display screens that display medical images, interface information, treatment planning parameters (e.g., contours, dosages, beam angles, labels, maps, etc.), treatment plans, a target, localizing a target and/or tracking a target, or any related information to the user. The input device 148 connected to the user interface 142 may be a keyboard, a keypad, a touch screen or any type of device that a user may input information to the radiotherapy system 100. Alternatively, the output device 146, the input device 148, and features of the user interface 142 may be integrated into a single device such as a smartphone or tablet computer (e.g., Apple iPad®, Lenovo Thinkpad®, Samsung Galaxy®, etc.).

Furthermore, any and all components of the radiotherapy system 100 may be implemented as a virtual machine (e.g., via VMWare, Hyper-V, and the like virtualization platforms) or independent devices. For instance, a virtual machine can be software that functions as hardware. Therefore, a virtual machine can include at least one or more virtual processors, one or more virtual memories, and one or more virtual communication interfaces that together function as hardware. For example, the radiotherapy processing computing system 110, the image data sources 150, or like components, may be implemented as a virtual machine or within a cloud-based virtualization environment.

The image processing logic 120 or other software programs may cause the computing system to communicate with the image data sources 150 to read images into memory 114 and the storage device 116, or store images or associated data from the memory 114 or the storage device 116 to and from the image data sources 150. For example, the image data source 150 may be configured to store and provide a plurality of images (e.g., 3D MRI, 4D MRI, 2D MRI slice images, CT images, 2D Fluoroscopy images, X-ray images, raw data from MR scans or CT scans, Digital Imaging and Communications in Medicine (DICOM) metadata, etc.) that the image data source 150 hosts, from image sets in image data 152 obtained from one or more patients via the image acquisition device 170 in model training or generation use cases. The image data source 150 or other databases may also store data to be used by the image processing logic 120 when executing a software program that performs image processing operations of creating, modifying, or generating sCT images from received CBCT images. Further, various databases may store the data produced by the trained models, including the network parameters constituting the models learned by the generative adversarial network model 138 and the resulting predicted data. The radiotherapy processing computing system 110 thus may obtain and/or receive the image data 152 (e.g., 2D MRI slice images, CT images, 2D Fluoroscopy images, X-ray images, 3DMRI images, 4D MRI images, etc.) from the image data source 150, the image acquisition device 170, the treatment device 180 (e.g., a MRI-Linac), or other information systems, in connection with performing radiation treatment or diagnostic operations.

The image acquisition device 170 can be configured to acquire one or more images of the patient's anatomy for a region of interest (e.g., a target organ, a target tumor or both). Each image, typically a 2D image or slice, can include one or more parameters (e.g., a 2D slice thickness, an orientation, and a location, etc.). In an example, the image acquisition device 170 can acquire a 2D slice in any orientation. For example, an orientation of the 2D slice can include a sagittal orientation, a coronal orientation, or an axial orientation. The processing circuitry 112 can adjust one or more parameters, such as the thickness and/or orientation of the 2D slice, to include the target organ and/or target tumor. In an example, 2D slices can be determined from information such as a 3D CBCT or CT, or MRI volume. Such 2D slices can be acquired by the image acquisition device 170 in "near real-time" while a patient is undergoing radiation therapy treatment, for example, when using the treatment device 180 (with "near real-time" meaning acquiring the data in at least milliseconds or less).

The image processing logic 120 in the radiotherapy processing computing system 110 is depicted as implementing image generation workflow 130 which involves the use of a trained (learned) generative model (e.g., implementing the method described below with reference to FIG. 8). This generative model may be provided by a generator 138B trained as part of a generative adversarial network (GAN) model 138. In an example, the image generation workflow 130 operated by the image processing logic 120 integrates with real CT image data processing 132 and CBCT image data processing 134 to generate sCT images based on the mapped (paired) CT and CBCT images used in training.

In an example, the generator 138B includes learned weights and values as a result of a training involving use of a discriminator 138A and the generator 138B in the GAN model 138, in connection with an image generation training workflow 140 that processes pairings of training data (e.g., parings of CBCT and real CT images). As indicated above, this training workflow 140 may obtain and utilize imaging data from the data sources 160, 150, and associated image data 152.

Figure 2A:
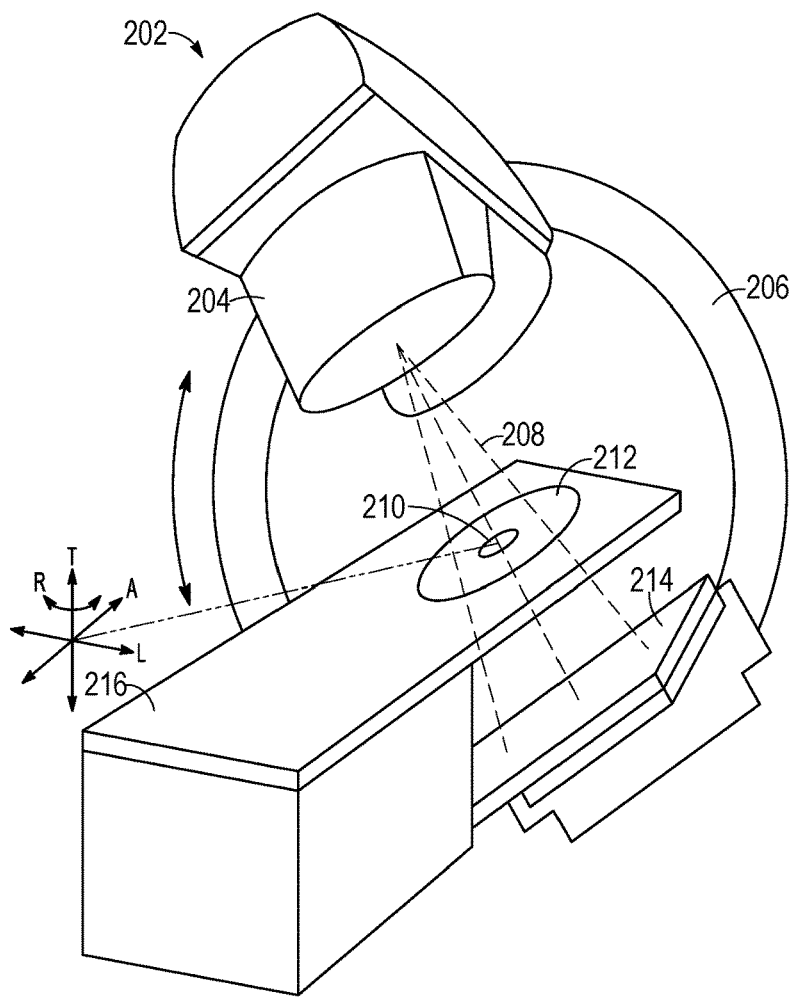
FIGS. 2A and 2B illustrate exemplary image-guided radiotherapy devices according to some examples of the disclosure.

FIG. 2A illustrates an exemplary image-guided radiation therapy device 202 that includes a radiation source, such as an X-ray source or a linear accelerator, a couch 216, an imaging detector 214, and a radiation therapy output 204. The radiation therapy device 202 may be configured to emit a radiation therapy beam 208 to provide therapy to a patient. The radiation therapy output 204 can include one or more attenuators or collimators, such as a multi-leaf collimator (MLC). As will be understood, the radiation therapy output 204 may be provided in connection with the image processing logic 120 which implements an image generation workflow 130 and the associated use of an image generation from a generator 138B of a GAN.

As an example, a patient can be positioned in a region 212, supported by the treatment couch 216, to receive a radiation therapy dose according to a radiation therapy treatment plan. The radiation therapy output 204 can be mounted or attached to a gantry 206 or other mechanical support. One or more chassis motors (not shown) may rotate the gantry 206 and the radiation therapy output 204 around couch 216 when the couch 216 is inserted into the treatment area. In an example, gantry 206 may be continuously rotatable around couch 216 when the couch 216 is inserted into the treatment area. In another example, gantry 206 may rotate to a predetermined position when the couch 216 is inserted into the treatment area. For example, the gantry 206 can be configured to rotate the therapy output 204 around an axis ("A"). Both the couch 216 and the radiation therapy output 204 can be independently moveable to other positions around the patient, such as moveable in transverse direction ("T"), moveable in a lateral direction ("L"), or as rotation about one or more other axes, such as rotation about a transverse axis (indicated as "R"). A controller communicatively connected to one or more actuators (not shown) may control the couch 216 movements or rotations in order to properly position the patient in or out of the radiation therapy beam 208 according to a radiation therapy treatment plan. Both the couch 216 and the gantry 206 are independently moveable from one another in multiple degrees of freedom, which allows the patient to be positioned such that the radiation therapy beam 208 can precisely target the tumor.

The coordinate system (including axes A, T, and L) shown in FIG. 2A can have an origin located at an isocenter 210. The isocenter 210 can be defined as a location where the central axis of the radiation therapy beam 208 intersects the origin of a coordinate axis, such as to deliver a prescribed radiation dose to a location on or within a patient. Alternatively, the isocenter 210 can be defined as a location where the central axis of the radiation therapy beam 208 intersects the patient for various rotational positions of the radiation therapy output 204 as positioned by the gantry 206 around the axis A.

Gantry 206 may also have an attached imaging detector 214. The imaging detector 214 is preferably located opposite to the radiation source (output 204), and in an example, the imaging detector 214 can be located within a field of the radiation therapy beam 208. Imaging detector 214 may implement image processing logic 120 (FIG. 1) to generate sCT images from CBCT images in real time. The imaging detector 214 can be mounted on the gantry 206, preferably opposite the radiation therapy output 204, such as to maintain alignment with the radiation therapy beam 208. The imaging detector 214 rotates about the rotational axis as the gantry 206 rotates. In an example, the imaging detector 214 can be a flat panel detector (e.g., a direct detector or a scintillator detector). In this manner, the imaging detector 214 can be used to monitor the radiation therapy beam 208, or the imaging detector 214 can be used for imaging the patient's anatomy, such as portal imaging. The control circuitry of radiation therapy device 202 may be integrated within the radiotherapy system 100 or remote from it.

In an illustrative example, one or more of the couch 216, the therapy output 204, or the gantry 206 can be automatically positioned, and the therapy output 204 can establish the radiation therapy beam 208 according to a specified dose for a particular therapy delivery instance. A sequence of therapy deliveries can be specified according to a radiation therapy treatment plan, such as using one or more different orientations or locations of the gantry 206, couch 216, or therapy output 204. The therapy deliveries can occur sequentially, but can intersect in a desired therapy locus on or within the patient, such as at the isocenter 210. A prescribed cumulative dose of radiation therapy can thereby be delivered to the therapy locus while damage to tissue nearby the therapy locus can be reduced or avoided.

Thus, FIG. 2A specifically illustrates an example of a radiation therapy device 202 operable to provide radiotherapy treatment to a patient, with a configuration where a radiation therapy output can be rotated around a central axis (e.g., an axis "A"). Other radiation therapy output configurations can be used. For example, a radiation therapy output can be mounted to a robotic arm or manipulator having multiple degrees of freedom. In yet another example, the therapy output can be fixed, such as located in a region laterally separated from the patient, and a platform supporting the patient can be used to align a radiation therapy isocenter with a specified target locus within the patient. In another example, a radiation therapy device can be a combination of a linear accelerator and an image acquisition device. In some examples, the image acquisition device may be an MRI, an X-ray, a CT, a CBCT, a spiral CT, a PET, a SPECT, an optical tomography, a fluorescence imaging, ultrasound imaging, or radiotherapy portal imaging device, etc., as would be recognized by one of ordinary skill in the art.

Figure 2B:
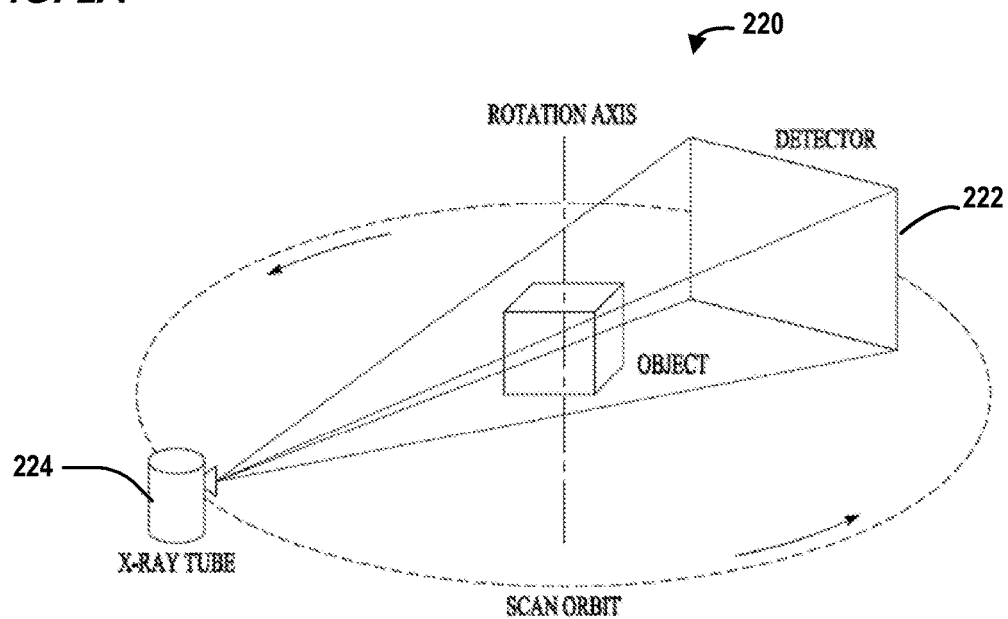

FIG. 2B illustrates an example of an X-ray cone beam computed tomography scanner 220 as one of the image acquisition devices of FIG. 2A and 170 (FIG. 1). The X-ray cone beam computed tomography scanner 220 can include an X-ray tube 224 and a detector 222. During operation, photons can be emitted from the X-ray tube 224 and can travel through a 3D object (e.g., a portion of a patient anatomy) before reaching the detector 222. The 3D object can absorb a portion of the emitted photons. The detector 222 can include a 2D flat plane that can convert received photons into corresponding electronic signals. The electronic signals can record the absorption strength along specific X-ray paths (straight-line paths), such as to form a 2D projection space image. To obtain 3D structural information of the 3D object, the 3D object can be rotated about a rotation axis or the X-ray tube 224 and detector 222 can be scanned in an orbit-like trajectory to obtain 2D projection space images from different view angles. In an example, the 2D projection space images can be collected over a range of more than 200 degrees, such as can correspond to hundreds of 2D projection space images.

Image reconstruction algorithms can be employed to form a 3D image of the 3D object from the 2D projection space images collected by the X-ray cone beam computed tomography scanner 220. The reconstruction algorithms can include analytical and iterative reconstruction algorithms. In an example, analytical algorithms (such as Feldkamp or Feldkamp-modified algorithms) can be used to process the 2D projection space images collected by the scanner 220 to obtain 3D reconstructed images. In an example, the analytical algorithms can process the 2D projection space images in several seconds. However, the 3D reconstructed images can suffer from artefacts, such as those introduced by discrepancies between the collected 2D projection space images and mathematical assumptions associated with the analytical algorithms. Additionally, artefacts can arise from other sources, such as noise. In an example, iterative algorithms can be used to process the 2D projection space images collected by the scanner 220 to obtain 3D reconstructed images. The iterative algorithms can suppress some, but not all, types of artefacts associated with analytical algorithms and can obtain better quality images than analytical algorithms, but the iterative algorithms can take a much longer time than the analytical algorithms, even with advanced GPU technology. Neither analytical nor iterative algorithms are effective for all types of artefacts. Artefacts in the images can include any one or more of noise, scatter, extinction artefacts, beam hardening artefacts, exponential edge gradient effects, aliasing effects, ring artefacts, motion artefacts, or misalignment effects.

Noise artefacts can include additive noise from round-off errors or electrical noise. Noise artefacts can also include photon-count noise that can follow a Poisson distribution. CBCT machines can be operated at currents of milliamperes, which can be approximately one order of magnitude below that of CT machines, and thus signal-to-noise in CBCT images can be lower than in CT images. Scattering artefacts can be caused by photons scattered by an object that deviate from travel along a straight-line path. In certain reconstruction algorithms where photons can be assumed to be travelling in straight-line paths, artefacts can be introduced because of scattering. Scattering artefacts can include inhomogeneous darkening in CBCT 2D/3D images. Extinction artefacts can be present where an object contains strongly absorbing material and the photons cannot penetrate the object, leading to a signal on a detector that is very weak or zero. Absorption information can be lost where the signal on the detector is very weak or zero. Extinction artefacts in 2D CBCT projection space images can cause artefacts in reconstructed CBCT 2D/3D images, such as strong, bright, streak-like artefacts. Beam hardening artefacts can occur where a polychromatic x-ray beam is used to form the 2D CBCT projection space images. In a polychromatic x-ray beam, low energy x-rays can be preferentially absorbed by tissue in a patient, such as can lead to a relative increase in the ratio of high energy x-rays to low energy x-rays. The relative increase in the ratio can lead to artefacts in reconstructed CBCT 2D/3D images. Exponential edge gradient effects (EEGE) can occur at sharp edges with high contrast to neighbouring structures. The EEGE can be caused by averaging a measured intensity over a finite beam width, whereas the algorithms for reconstruction assume a zero beam width. The EEGE can provide for a reduced computed density value and can cause streaks tangent to long straight edges in a direction of projection. Aliasing artefacts can occur when an image sampling frequency (pixels per unit area) is less than twice the value of the spatial frequency being sampled. Aliasing artefacts can also occur as a result of a diverging cone beam, such as that used in collecting CBCT projection space images. Ring artefacts can be caused by defects or uncalibrated detector elements. Ring artefacts can appear as concentric rings centered about an axis of rotation. Motion artefacts and misalignment effects can be caused by a misalignment of any one of a source, object, and detector during collection of the CBCT images.

These CBCT images can be improved with uses of deep learning (DL)/machine learning (ML) approaches involving a GAN as discussed herein, such as using image processing logic 120 (FIG. 1). AI, DL, or ML are all based on mathematical analyses of random variable probabilities and their probability distributions. Typically random variables are observed as pairs X, Y, $\{x_i,y_i\}$, i=1, N, where for each value $x_i \in X$ we wish to assign it to a class or category represented by the scalar category index $y_i \in Y$ (classification), or assign it a numeric value according to some function $y_i = f(x_i)$ (regression).

All classification or regression methods rely on the concept of probability distributions to describe the random variables X, Y. The probability distribution for random variable X, p(x) (x is either discrete or continuous) must satisfy: 1) the domain of p(x) must be the set of all possible values of x, 2) for all $x \in X$, $p(x) \geq 0$, and 3) $\int_x p(x)dx=1$. A sample x drawn from distribution p(x) is written x~p(x). The joint distribution of X, Y is written p(x, y) and the marginal distribution of x, p(x) given the joint distribution p(x, y) is p(x)=∫p(x, y)dy. The probability of observing y conditioned on the value of x is p(y|x)=p(x,y)/p(x). The conditional probability of observing y given data x is called the data likelihood. Bayes' rule connects the X, Y conditional likelihoods as P(y|x)=p(x|y)p(y)/p(x).

The goal of statistical learning is to determine a mapping $f: x \rightarrow y$ that associates any y with an x. One of the most important methods is maximum likelihood estimation. The training data are assumed to be generated by a process $p_{data}(x, y)$ Finding the mapping involves learning a model process $p_{model}(x;\theta)$ that includes parameters $\theta$ that the mapping is dependent on in addition to x. For example, the $\theta$ may include neural network layer weights and bias parameters. Maximum likelihood estimates the parameters $\theta_L$ that give the most likely values of x as $$\theta_L = \text{argmax}_\theta E_{x \sim p_{data}}[\log p_{model}(x;\theta)] \quad \text{(EQUATION 1)}$$

where E is the expected value of the bracketed argument. Since probability distributions are difficult to approximate, and since the goal is to minimize the difference between the $p_{data}(x)$ and the $p_{model}(x; \theta)$ distributions, the KL divergence provides a data-driven alternative, $$D_{KL}(p_{data}\|p_{model}) = E_{x \sim p_{model}}[\log p_{data}(x) - \log p_{model}(x)] \quad \text{(EQUATION 2)}$$

where the maximum likelihood is equivalent to minimizing the difference between the model and data distributions. The $\log p_{data}(x)$ term is independent of the model so that to minimize $D_{KL}$ one needs to minimize, $$-E_{x \sim p_{data}}[\log p_{model}(x)] \quad \text{(EQUATION 3)}$$

which is the same as Equation (1) with the $\theta$ implied in model expression. The desired mapping is then $f(\theta)$: $x \sim p_{model} \rightarrow y$.

The presently disclosed system for CT image modeling and sCT image generation utilizing a multi-path approach (one with deformable offset layers and one without deformable offset layers) provides a useful application of modern neural network technology to model radiotherapy treatment planning and image generation. Neural networks (NNs) have been studied since the 1960s for solutions to classification problems (assigning observed data x to one of two or more classes $y_i$, i=1, . . . , n) and regression problems (associating observed data x with the value y of a parameter pertaining to that data). The generation of CT and CBCT image parameters may be considered a regression problem, which is produced through the use of a NN generative model learned through a GAN configuration. While the above and below description pertains to multi-path approaches where one path has deformable offset layers and one path does not, the deformable offset layers can take other forms or types (e.g., spatial transformation layers or transformers) that can be utilized to store deformed structure information.

Simple NNs consist of an input layer, a middle or hidden layer, and an output layer, each containing computational units or nodes. The hidden layer(s) nodes have input from all the input layer nodes and are connected to all nodes in the output layer. Such a network is termed "fully connected." Each node communicates a signal to the output node depending on a nonlinear function of the sum of its inputs. For a classifier, the number of input layer nodes typically equals the number of features for each of a set of objects being sorted into classes and the number of output layer nodes is equal to the number of classes. A network is trained by presenting it with the features of objects of known classes, and adjusting the node weights to reduce the training error by an algorithm called backpropagation. Thus, the trained network can classify novel objects whose class is unknown.

Neural networks have the capacity to discover relationships between the data and classes or regression values, and under certain conditions, can emulate any function y=f(x) including non-linear functions. In ML, an assumption is that the training and test data are both generated by the same data-generating process, n data, in which each $\{x_i, y_i\}$ sample is identically and independently distributed (i.i.d.). In ML, the goals are to minimize the training error and to make the difference between the training and test errors as small as possible. Underfitting occurs if the training error is too large; overfitting occurs when the train-test error gap is too large. Both types of performance deficiency are related to model capacity; large capacity may fit the training data very well but lead to overfitting; small capacity may lead to underfitting. Since DNNs have enormous capacity, overfitting is a more common concern in machine learning.

Deep learning is a machine learning method employing DNNs with large numbers of hidden layers, with inputs and outputs arranged in complex ways and producing human-level performance on image and speech recognition tasks. In the present examples, the DNNs can be trained to determine the relationship between observed data X and an output Y. The data $X=\{X_1, \ldots, X_n\}$ is a collection of CBCT images and the output Y is a sCT image.

The action of the DNN is symbolically captured by the function $f(\bullet)$ $$Y^* = f(X;\Theta) \quad \text{(EQUATION 4)}$$

where $\Theta = (\theta_1, \ldots, \theta_n)^T$ is a vector of the parameters pertaining to the trained NN for which the Y* is the closest approximation of the true Y observed in training. The DNN is trained using data sets $\{X, Y\}_i$, i=1, . . . , N of training CBCT images X and known real corresponding or registered CT images Y. Training minimizes a cost function $J(\Theta)$ of the sort $$J(\Theta^*) = \text{argmin}_\Theta \|Y - Y^*\|^2 \quad \text{(EQUATION 5)}$$

where $\Theta^*$ is the set of parameters that minimizes the mean squared error between the actual Y and the estimate Y*. In deep learning, the cost functions frequently express the data approximation function as a probabilistic function of the problem variables, or the conditional likelihood of observing Y given X and subject to the values of the parameters Θ expressed as P(Y|X; Θ), for which the optimal parameters $\Theta_{ML}$ are obtained by maximizing the likelihood, $$\Theta_{ML} = \text{argmax}_\Theta P(Y|X;\Theta) \qquad \text{(EQUATION 6)}$$

or alternatively $$\Theta_{ML} = \text{argmax}_\Theta \sum_{i=1}^{T} \log P(Y_i | X_i; \Theta). \qquad \text{(EQUATION 7)}$$

summed over the training data.

The DNN output that results in the identification of sCT images belonging to real CT classes is an example of classification. In this case, the DNN output will be the real valued elements $y_j$ of the CBCT image map $Y=(y_1, \ldots, y_m)^T$, meaning that the network computation will be an example of regression.

DNNs have many more layers (are much deeper) than basic NN implementations, as DNNs often include dozens or hundreds of layers, each layer composed of thousands to hundreds of thousands of nodes, with the layers arranged in complex geometries. In addition to weighted sums of inputs, some layers compute other operations on the prior layer outputs such as convolution. Convolutions and the filters derived from them can locate edges in images, or temporal/pitch features in sound streams, and succeeding layers find larger structures composed of these primitives. Such trained DNNs which involve the use of convolutional layers are referred to as convolutional neural networks (CNNs).

Skip connections are an important CNN architectural innovation. Originally introduced to improve accuracy and shorten training, skip connections splice nodal data at one level of a network with that of nodes at another level. An important example is the U-Net architecture developed for medical image segmentation. As further discussed below, the "left" part of the "U" encodes the image data as convolution filter features and the "right" part of the "U" decodes those features onto successive higher-resolution representations. The combination of encoded and decoded features across the same network hierarchy levels leads to more accurate classifications. Another variation of a skip connection is implemented within each CNN block, forcing training on differences (residuals) between layer outputs instead of the layer outputs directly. This "ResNet" architecture and its many variants can produce improved NN accuracy.

Figure 3A:
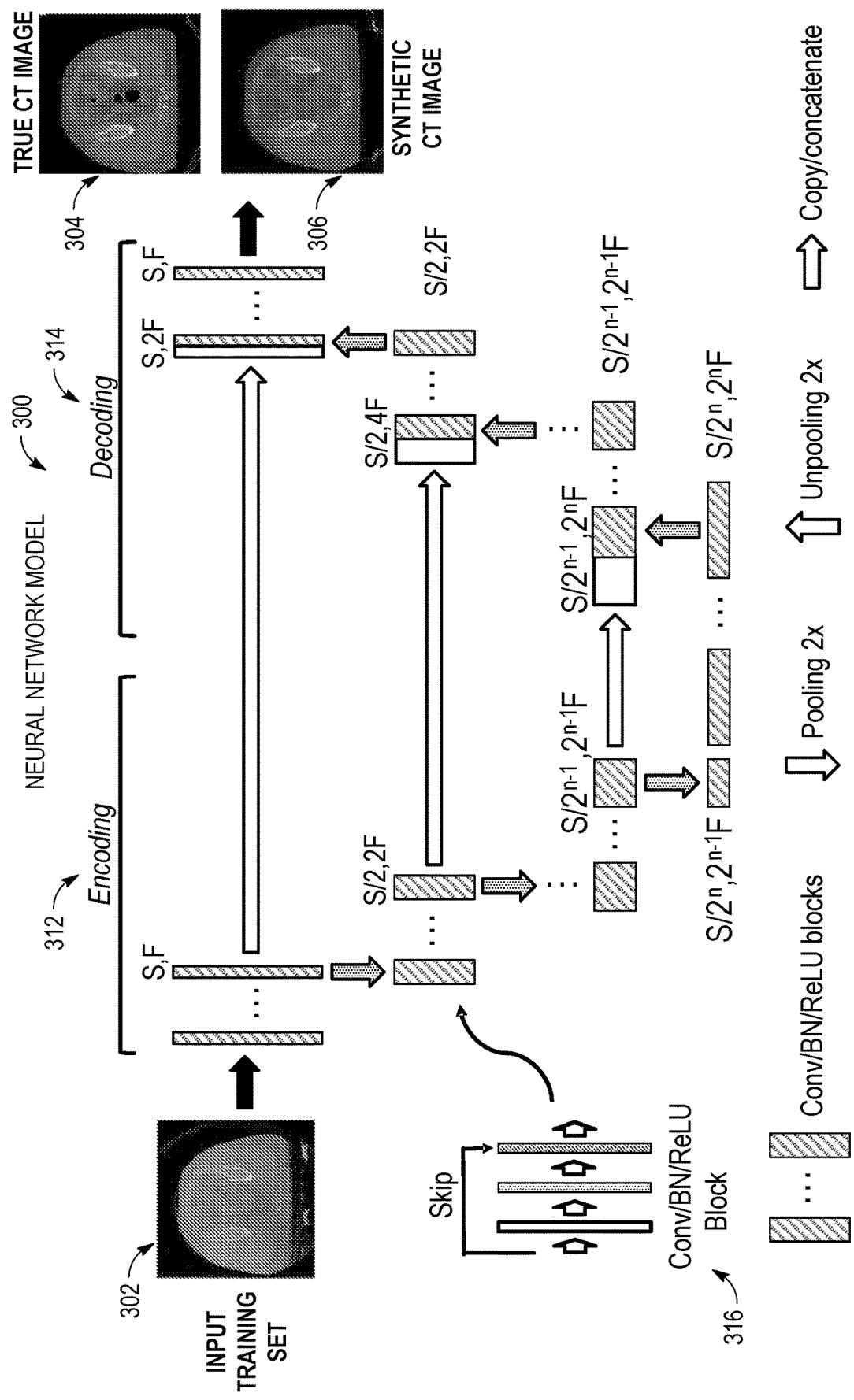
FIGS. 3A and 3B illustrate an exemplary convolutional neural network model adapted for generating and discriminating a sCT image from a received CBCT image according to some examples of the disclosure.

FIG. 3A illustrates an exemplary CNN model 300 adapted for generating a synthetic CT image (sCT) according to the present disclosure. Specifically, the model 300 depicts an arrangement of a "U-Net" deep CNN designed for generating an output data set (an output sCT image 306) based on an input training set (e.g., paired CBCT and CT images 302, 304). The name derives from the "U" configuration, and as is well understood, this form of a NN model can produce pixel-wise classification or regression results. In some cases, a first path leading to the CNN model 300 includes one or more deformable offset layers and one or more convolution layers, and a second path leading to the CNN model 300 includes the one or more convolution layers without the deformable offset layers. The model 300 generates in parallel or sequentially, via the first and second paths, as output data set, first and second sCT images 306 (one that is generated via the first path and one generated via the second path).

The left side of the model operations (the "encoding" operations 312) learns a set of features that the right side (the "decoding" operations 314) uses to reconstruct an output result. The U-Net has n levels consisting of conv/BN/ReLU (convolution/batch normalization/rectified linear units) blocks 316, and each block has a skip connection to implement residual learning. The block sizes are denoted in FIG. 3A by "S" and "F" numbers; input images are S×S in size, and the number of feature layers is equal to F. The output of each block is a pattern of feature responses in arrays the same size as the images.

Proceeding down the encoding path, the size of the blocks decreases by ½ or $2^{-1}$ at each level while the size of the features by convention increases by a factor of 2. The decoding side of the network goes back up in scale from $S/2^n$ while adding in feature content from the left side at the same level; this is the copy/concatenate data communication. The input images 302, 304 shown in FIG. 3A are provided for training the network to evaluate the conv/BN/ReLU layer parameters, as there would be no output image. For inference, or testing, with use of the model, the input would be a single image of the CBCT image 302 and the output would be a sCT image 306.

Figure 3B:
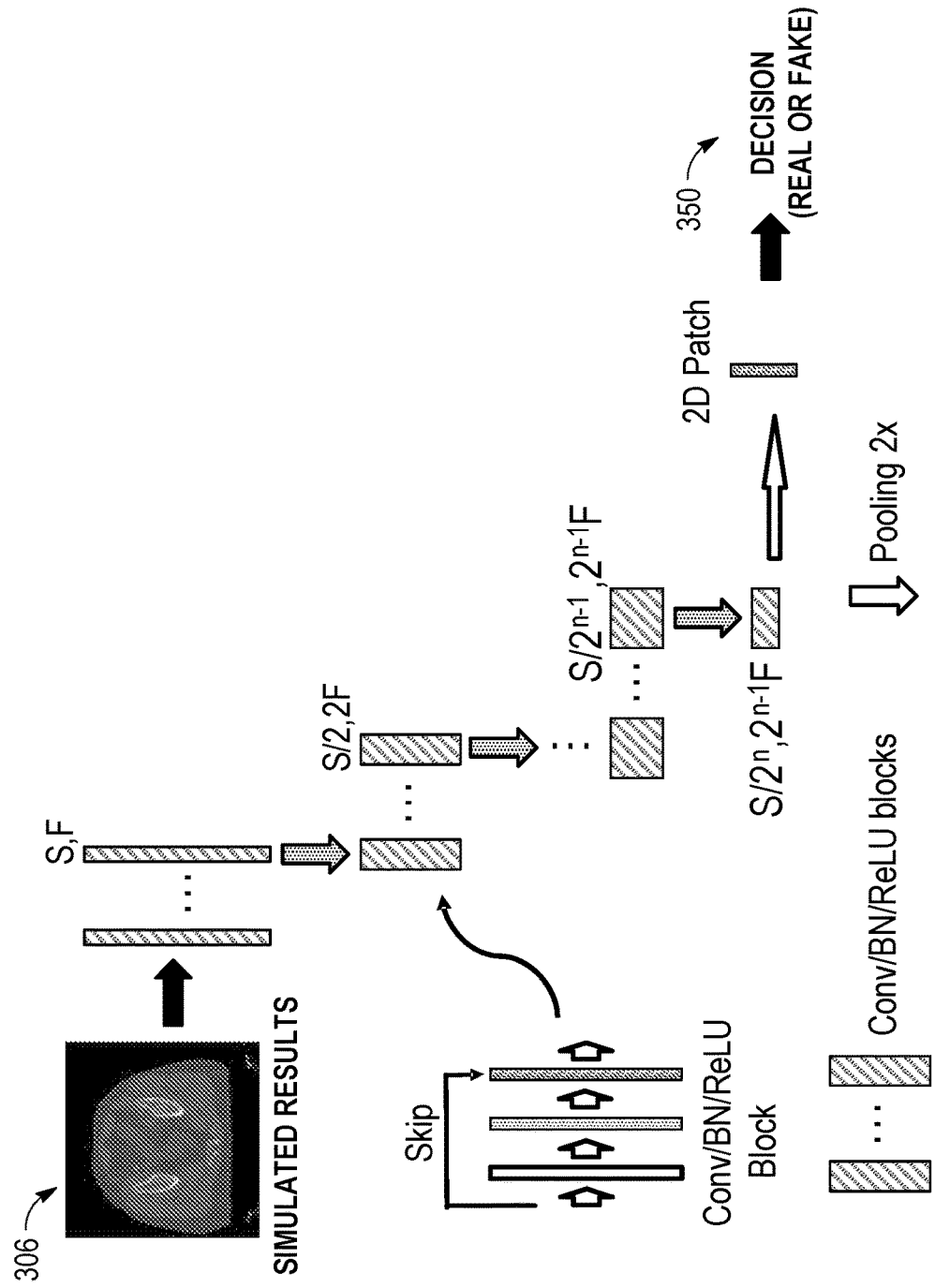

The representation of the model 300 of FIG. 3A thus illustrates the training and prediction of a generative model, which is adapted to perform regression rather than classification. FIG. 3B illustrates an exemplary CNN model adapted for discriminating a synthetic CT image (sCT) according to the present disclosure. The discriminator network shown in FIG. 3B may include several levels of blocks configured with stride-2 convolutional layers, batch normalization layers and ReLu layers, and separated pooling layers. At the end of the network, there will be one or a few fully connection layers to form a 2D patch for discrimination purposes. The discriminator shown in FIG. 3B may be a patch-based discriminator configured to receive an input sCT image (e.g., generated from the first path from the generator shown in FIG. 3A that includes the deformable offset layers), classify the image as real or fake, and provide the classification as output 350.

Consistent with embodiments of the present disclosure, the treatment modeling methods, systems, devices, and/or processes based on such models include two stages: training of the generative model, with use of a discriminator/generator pair in a GAN; and prediction with the generative model, with use of a GAN-trained generator. Various examples involving a GAN and a CycleGAN for sCT image generation are discussed in detail in the following examples. It will be understood that other variations and combinations of the type of deep learning model and other neural-network processing approaches may also be implemented with the present techniques. Further, although the following examples are discussed with reference to images and image data, it will be understood that the following networks and GAN may operate with use of other non-image data representations and formats. Also, while two paths are discussed as being used to generate first and second sCT images during training, only one path (the second path that does not include the deformable offset layers) is used in practice after the generator is trained to generate an sCT image given a CBCT image.

In deep CNN training, the learned model is the values of layer node parameters θ (node weights and layer biases) determined during training. Training employs maximum likelihood or the cross entropy between the training data and the model distribution. A cost function expressing this relationship is $$J(\theta) = -E_{x,y\sim p_{data}} \log p_{model}(y|x) \quad \text{(EQUATION 8)}$$

The exact form of the cost function for a specific problem depends on the nature of the model used. A Gaussian model $p_{model}(y|x) = N(y; f(x;\theta))$ implies a cost function such as:

$$J(\theta) = \tfrac{1}{2} E_{x,y\sim p_{data}} \|y - f(x;\theta)\|_2^2 + \text{const} \quad \text{(EQUATION 9)}$$

Which includes a constant term that does not depend on θ. Thus, minimizing J(θ) generates the mapping ƒ(x; θ) that approximates the training data distribution.

Figure 4:
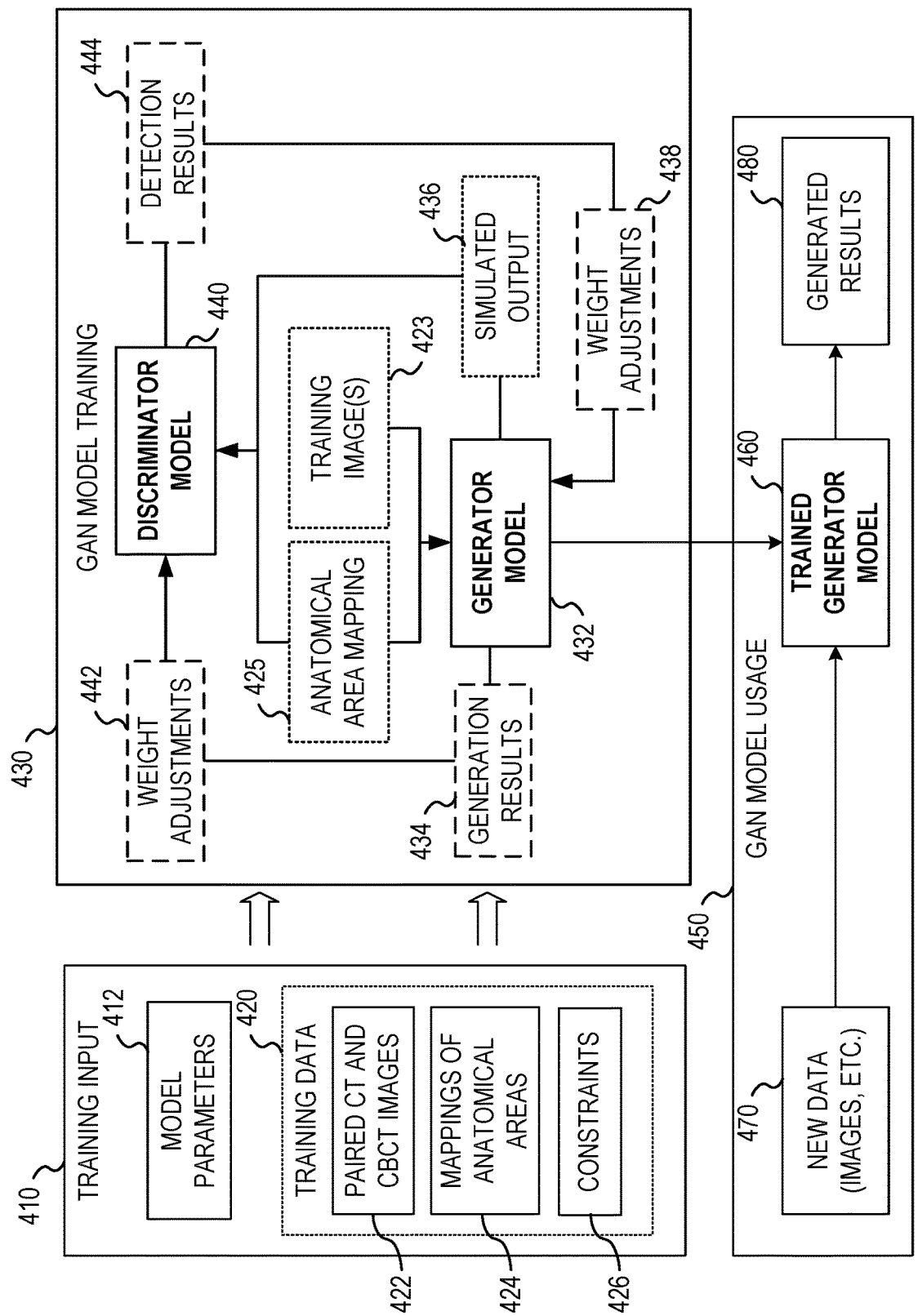
FIG. 4 illustrates an exemplary data flow for training and use of a generative adversarial network adapted for generating a sCT image from a received CBCT image according to some examples of the disclosure.

FIG. 4 illustrates an exemplary data flow for training and use of a generative adversarial network adapted for generating a synthetic CT image from a received CBCT image. For instance, the generator model 432 of FIG. 4, which is trained to produce a trained generator model 460, via multiple parallel paths (one that includes convolution layers and one or more deformable offset layers and one that includes only convolution layers), may be trained to implement the processing functionality 132, 134 provided as part of the image processing logic 120 in the radiotherapy system 100 of FIG. 1. Accordingly, a data flow of the GAN model usage 450 (prediction) is depicted in FIG. 4 as the provision of new data 470 (e.g., CBCT input images from a new patient) to a trained generator model 460, and the use of the trained generator model 460 to produce a prediction or estimate of generated results 480 (e.g., sCT images corresponding to the input CBCT images).

GANs comprise two networks: a generative network (e.g., generator model 432) that is trained to perform classification or regression, and a discriminative network (e.g., discriminator model 440) that samples the generative network's output distribution (e.g., simulated output 436) and decides whether that sample is the same or different from the true test distribution. The goal for this system of networks is to drive the generator network to learn the ground truth model as accurately as possible such that the discriminator net can only determine the correct origin for generator samples with 50% chance, which reaches an equilibrium with the generator network. The discriminator can access the ground truth but the generator only accesses the training data through the response of the detector to the generator's output.

The data flow of FIG. 4 illustrates the receipt of training input 410, including various values of model parameters 412 and training data 420 (with such training images 423 including CBCT patient imaging data, real CT images corresponding to the patient imaging data, and/or mappings of anatomical areas 424 and 425, conditions or constraints 426). The training input 410 is provided to the GAN model training 430 to produce a trained generator model 460 used in the GAN model usage 450. Mappings of anatomical areas 424 and 425 provide the metric used to compare similarities between two images (e.g., using SSIM weights).

As part of the GAN model training 430, the generator model 432 is trained on mappings of anatomical areas 424 and real CT and CBCT image pairs 422 (also depicted in FIG. 3A as 302, 304), to produce and map segment pairs in the CNN. In this fashion, the generator model 432 is trained, via multiple paths, to produce first and second simulated or synthetic CT image representations 436 based on an input map. The first sCT image representation 436 is generated by the generator model 432 by applying one or more deformable offset layers and one or more convolutional layers to the input training image at a first input interface of the generator model 432. The second sCT image representation 436 is generated by the generator model 432 by applying the one or more convolutional layers and without applying the deformable offset layers at a second input interface of the generator model 432. All of the rest components of the generator model 432 (e.g., the components used to process information and generate the sCT image representations past the first and second input interfaces) are shared by the multiple paths, meaning that the generator is trained based on the outputs of both paths. The discriminator model 440 decides whether a simulated representation 436 is from the training data (e.g., the true CT image) or from the generator (e.g., the sCT, as communicated between the generator model 432 and the discriminator model 440 with the generation results 434 and the detection results 444). The discriminator model 440 only operates and is trained based on the first sCT image representation 436 (e.g., the one generated using the deformable offset layers). In this way, the generator model 432 is trained utilizing the discriminator on the generated images through the first path including the deformable offset layers and is further trained based on cycle-consistency loss information that is generated based on both the generated images through the first path including the deformable offset layers and the second path without deformable offset layers. This training process results in back-propagation of weight adjustments 438, 442 to improve the generator model 432 and the discriminator model 440.

Thus, in this example, data preparation for the GAN model training 430 requires CT images that are paired with CBCT images (these may be referred to as training CBCT/CT images). In an example, the original data includes pairs of CBCT image sets and corresponding CT images that may be registered and resampled to a common coordinate frame to produce pairs of anatomy-derived images.

In detail, in a GAN model, the generator (e.g., generator model 432) learns a distribution over the data x, $p_G(x)$, starting with noise input with distribution $p_z(z)$ as the generator learns a mapping G (z; $\theta_G$):$p_z(z) \to p_G(x)$ where G is a differentiable function representing a neural network with layer weight and bias parameters $\theta_G$. The discriminator, D(x; $\theta_D$) (e.g., discriminator model 440), maps the generator output to a binary scalar {true, false}, deciding true if the generator output is from actual data distribution $p_{data}(x)$ and false if from the generator distribution $p_G(x)$. That is, D (x) is the probability that x came from $p_{data}(x)$ rather than from $p_G(x)$.

Figure 5:
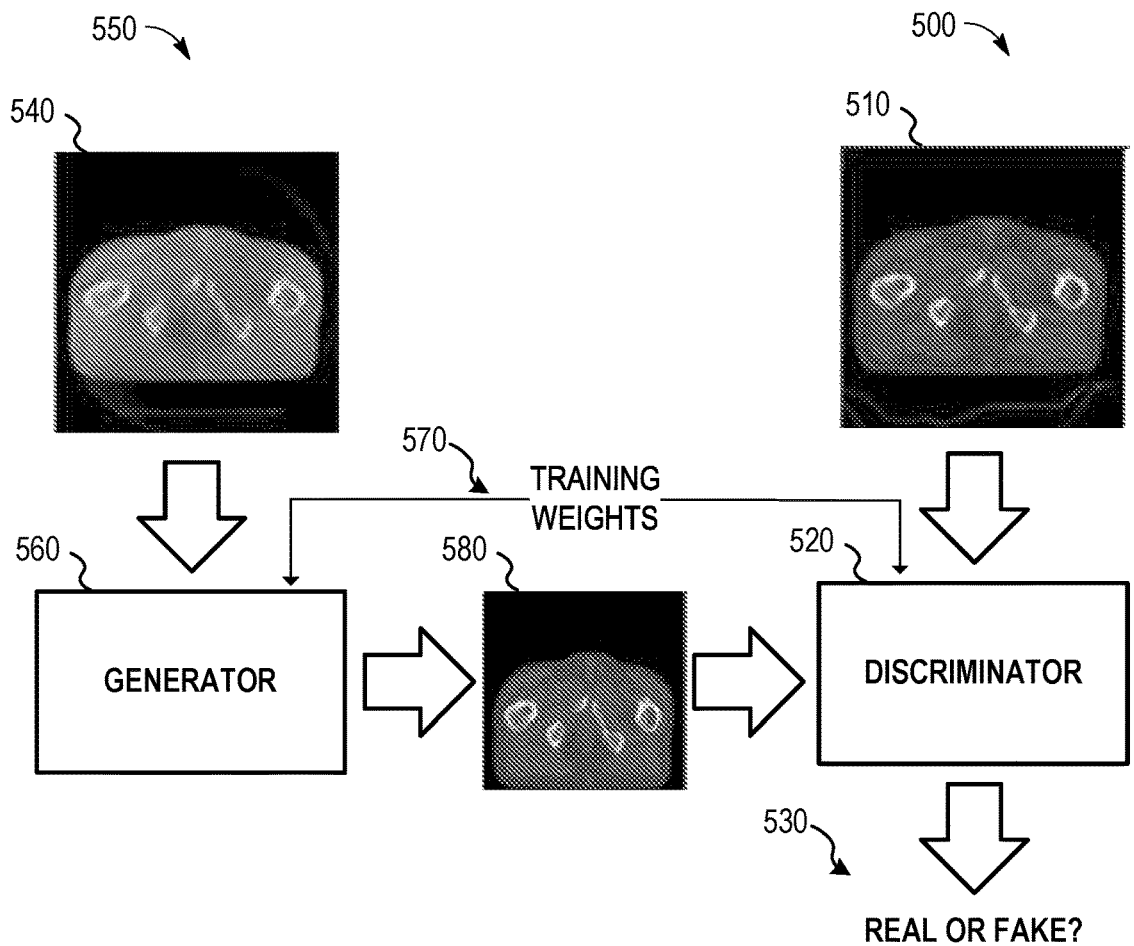
FIG. 5 illustrates training of a generative adversarial network for generating a sCT image from a received CBCT image according to some examples of the disclosure.

FIG. 5 illustrates training in a GAN for generating a synthetic CT image model, according to the example techniques discussed herein. FIG. 5 specifically shows the operation flow 550 of a GAN generator model G 560, designed to produce a simulated (e.g., estimated, artificial, etc.) output sCT image 580 as a result of an input CBCT image 540. FIG. 5 also shows the operation flow 500 of a GAN discriminator model D 520, designed to produce a determination value 530 (e.g., real or fake, true or false) based on an input (e.g., a real CT image 510 or the generated sCT image 580). In particular, discriminator model D 520 is trained to produce an output that indicates whether discriminator model D 520 determines the generated sCT image 580 is real or fake.

In the context of the GAN, the discriminator D 520 is trained to maximize the probability of assigning the correct label to samples from both distributions, whereas the generator G 560 is trained to minimize the log(1−D(G(z))), based on adjusted training weights 570 applied during training. D, G can be regarded as playing a two-player minimax game with value function V(D, G) as follows:

$$\min_G \max_D V(D,G) = E_{y \sim p(CT)}[\log D(y)] + E_{x \sim p(CBCT)}[\log(1-D(G(x)))] \quad \text{(EQUATION 10)}$$

Early in learning, when G is performing poorly, the log(1−D(G(x))) term dominates V(D,G) and causes early and incorrect termination. Instead of training G to minimize log(1−D(G(x))), G can be trained to maximize log(1−D(G(x))), thereby producing more informative gradients earlier in training. Further, as training progresses, the distribution $p_G(x)$ converges to the true data distribution $p_{data}(x)$.

Figure 6A:
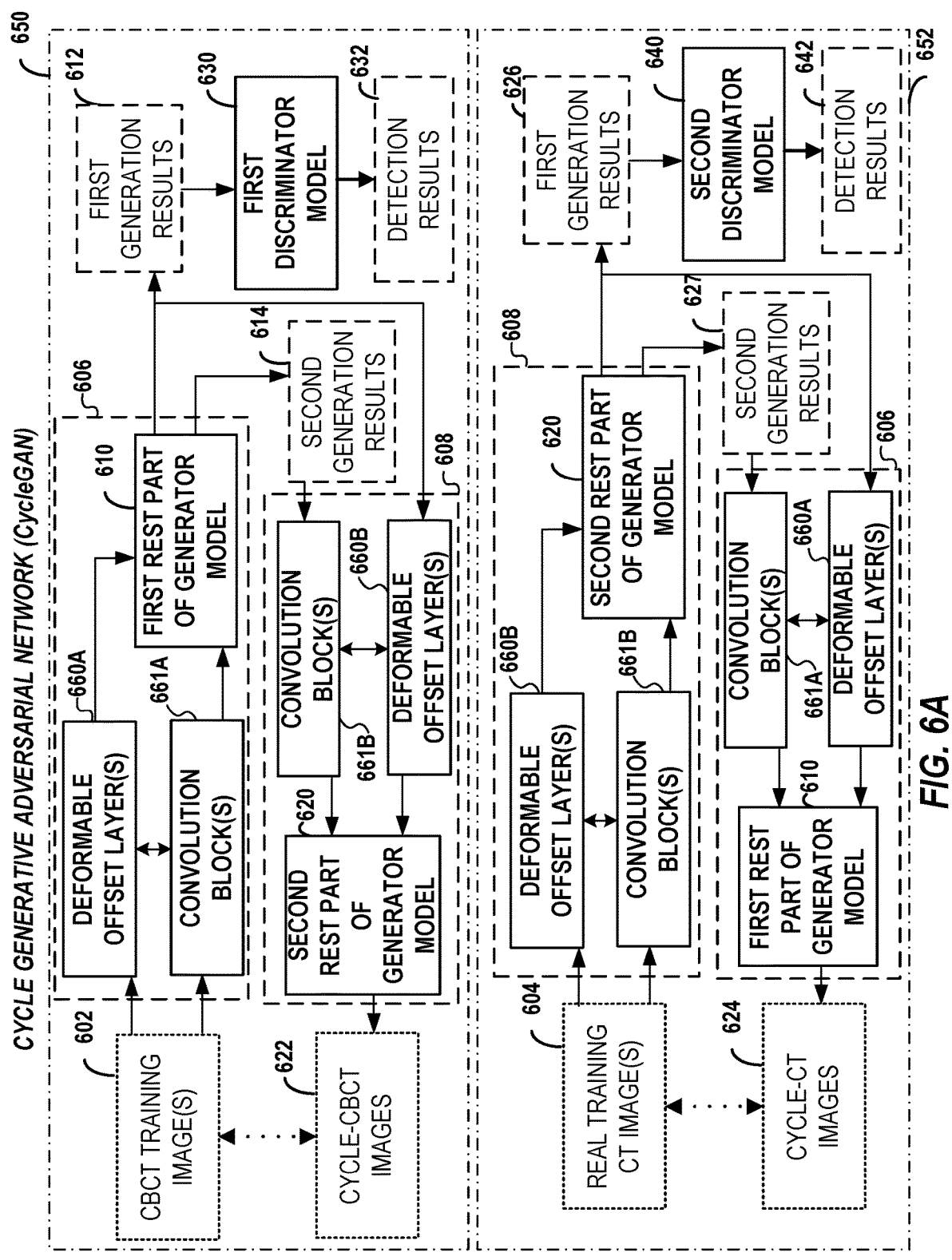
FIG. 6A-D illustrate training and use of a cycle generative adversarial network for generating a sCT image from a received CBCT image according to some examples of the disclosure.

A useful extension of a GAN is the CycleGAN which is described below in connection with FIGS. 6A-D. FIG. 6A illustrates training and use of CycleGAN 600 for generating a sCT image from a received CBCT image via multiple paths (certain ones including one or more deformable offset layers and one or more convolution layers/blocks, and certain other ones including the one or more convolution layers/blocks without the one or more deformable offset layers) according to some examples of the disclosure. Cycle-GAN 600 includes one or more deformable offset layers 660A, 660B, one or more convolution blocks 661A, 661B, first rest part of generator model 610, second rest part of generator model 620, first discriminator model 630, and second discriminator model 640. First rest part of generator model 610 including the first and second input interfaces (e.g., deformable offset layers 660A and convolution blocks 661A) is our first generator model 606, and second rest part of generator model 620 including the first and second input interfaces (e.g., deformable offset layers 660B and convolution blocks 661B) is the second generator model 608. These two models 606 and 608 may each be an implementation of generator model 432 (FIG. 4) (e.g., as regression-type DCNN models), and first discriminator model 630 and second discriminator model 640 may each be an implementation of discriminator model 440 (e.g., as classification-type DCNN models). CycleGAN 600 may be divided into two portions, first portion 650 and second portion 652.

First rest part of generator model 610 represents a portion of the first generator model that is shared by two separate input interfaces to the first generator model. Namely, one input interface of the first rest part of generator model 610 includes a path through the deformable offset layers 660A and the convolution blocks 661A and the second input interface of the first rest part of generator model 610 includes a path only through the convolution blocks 661A without the deformable offset layers 660A. After the first generator model is trained, only the input interface that includes the convolution blocks 661A without the deformable offset layers 660A is used. Second rest part of generator model 620 represents a portion of the second generator model that is shared by two separate input interfaces to the second generator model. Namely, one input interface of the second rest part of generator model 620 includes a path through the deformable offset layers 660B and the convolution blocks 661B and the second input interface of the second rest part of generator model 620 includes a path only through the convolution blocks 661B without the deformable offset layers 660B. After the second generator model is trained, only the input interface that includes the convolution blocks 661B without the deformable offset layers 660B is used. The convolution blocks 661A and 661B may be trained together or separate from training of the generator and discriminator models. Specifically, the convolution blocks 661A and 661B are trained to obtain the correct weights to perform their function.

The deformable offset layers 660A and 660B may each be trained to coordinate offsets, resample, and perform interpolation. The deformable offset layers 660A and 660B may be trained together or separate from training of the generator and discriminator models. Specifically, the deformable offset layers 660A and 660B are trained to obtain the correct weights to perform their function. The effect of these offset layers changes the original regular sampling grids from upper convolutional blocks, introduces coordinate offsets, and resamples the images using interpolation. In this way, the deformable offset layers 660A and 660B can incorporate structure deformation information. An illustrative implementation of one of the deformable offset layers 660A and 660B is shown and described in connection with FIG. 6B. The deformable offset layers 660A and 660B may alternatively or in addition be implemented using a spatial transformer, other types of convolutional layers, and/or any other module that can store deformed structure information for an image. The number of offset layers in the deformable offset layers 660A and 660B may vary based on image size, how many down-sampling convolutional layers (e.g., the number of convolution blocks in the one or more convolution blocks 661A and 661B), and other factors.

Figure 6B:
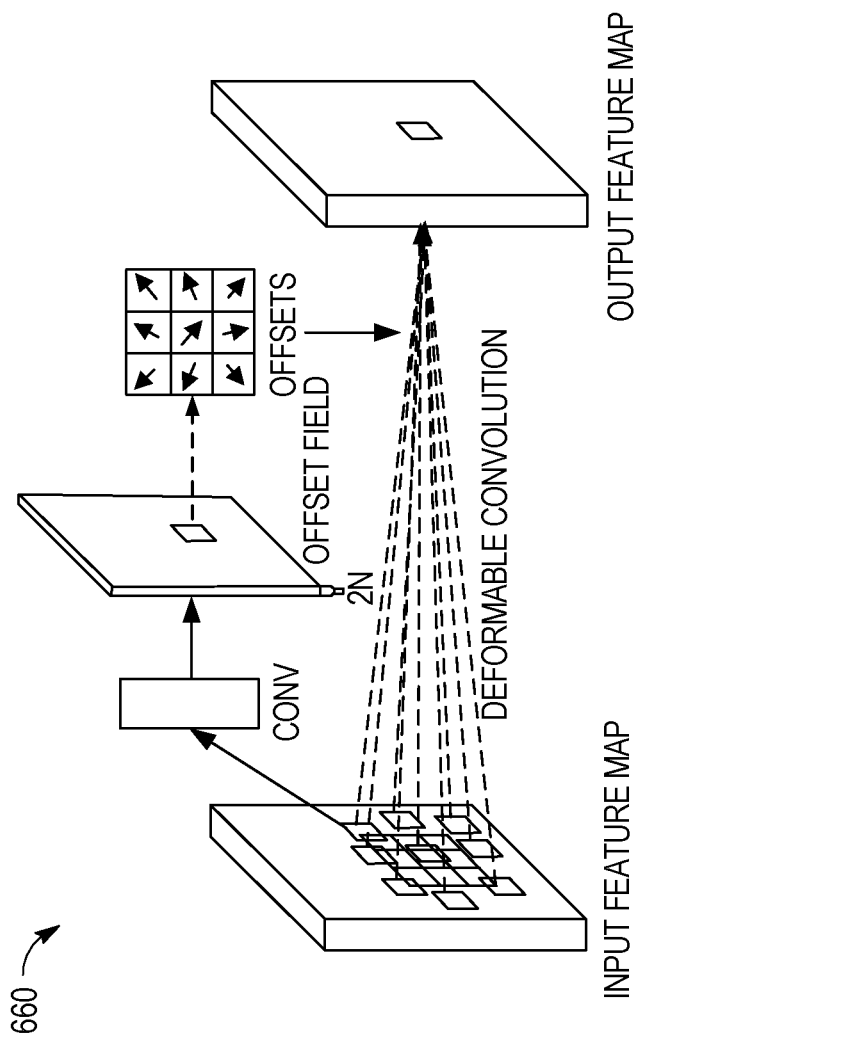

As shown in FIG. 6B, one of the deformable offset layers 660A/660B includes an input feature map, a convolution block, an offset field, and an output feature map. FIG. 6B specifically shows a 3×3 deformable convolution, but any other size deformable convolution can similarly be provided. The 2D convolution consists of two steps: 1) sampling using a regular grid R over the input feature map x; 2) summation of sampled values weighted by w. The grid R defines the receptive field size and dilation. For example, R={(−1,−1), (−1,0), ..., (0,1), (1,1)} defines a 3×3 kernel with dilation 1. For each location $p_0$ on the output feature map y, the following representation can be provided:

$$y(p_0) = \sum_{p_n \in \mathcal{R}} w(p_n) \cdot x(p_0 + p_n),$$

where $p_n$ enumerates the locations in R.

In deformable convolution, the regular grid R is augmented with offsets $\{\Delta p_n | n=1, \ldots, N\}$, where N=|R|. In such cases, the above representation becomes:

$$y(p_0) = \sum_{p_n \in \mathcal{R}} w(p_n) \cdot x(p_0 + p_n + \Delta p_n).$$

Now, the sampling is on the irregular and offset locations $p_n + \Delta p_n$. As the offset $\Delta p_n$ is typically fractional, the representation above can be implemented via bilinear interpolation as:

$$x(p) = \sum_q G(q, p) \cdot x(q)$$

where p denotes an arbitrary (Fraction) location ($p = p_0 + p_n + \Delta p_n$), q enumerates all integral spatial locations in the feature map x, and G(•,•) is the bilinear interpolation kernel. G may be two-dimensional and can be separated into two one-dimensional kernels as:

$$G(q,p) = g(q_x, p_x) \cdot g(q_y, p_y),$$

where g(a, b) = max(0, 1−|a−b|).

As shown in FIG. 6B, the offsets are obtained by training a convolutional layer over the same input feature map. The convolution kernel is of the same spatial resolution and dilation as those of the current convolutional layer. The output offset fields have the same spatial resolution with the input feature map. The channel dimension 2N corresponds to N 2D offsets map for x and y directions, respectively (e.g., N+N=2N) (x direction has N, and y direction has another N). During training, both the convolutional kernels for generating the output features and the offsets are learned simultaneously. To learn the offsets, the gradients are back-propagated through the bilinear operations in the above equations. In certain cases, the convolution kernels of FIG. 6B are implemented or shared with the convolution blocks 661.

Referring back to FIG. 6A, in an example, in first portion 650, first rest part of generator model 610 may be trained to receive a CBCT training image 602 (which may include one of image pairs 422) via first and second paths and generate respective first and second sCT images as generation results 612 and 614. Specifically, the CBCT training image 602 may be processed in a first path by the one or more deformable offset layers 660A and the one or more convolution blocks 661A to produce the first sCT image as generation results 612. The CBCT training image 602 may be processed in a second path by the convolution blocks 661A without being processed by the deformable offset layers 660A to produce the second sCT image as generation results 614. The first generator model 610 that includes the first input interface with the deformable offset layers 660A and convolution blocks 661A and that generates the first generation results 612 via the first path is referred to as $G_{offset}^{cbct2ct}$ and the first generator model 610 that includes the second input interface with the convolution blocks 661A and without the deformable offset layers 660A and that generates the second generation results 614 via the second path is referred to as $G^{cbct2ct}$. The generator $G^{cbct2ct}$ shares all network layers and weights with the generator $G_{offset}^{cbct2ct}$, and it is part of generator $G_{offset}^{cbct2ct}$, but without all those offset layers 660A.

In the first path, the CBCT training image 602 may be processed by a first deformable offset layer in the deformable offset layers 660A and the output of the first deformable offset layer is provided to a first convolution block in the one or more convolution blocks 661A. The output of the first convolution block is then provided to be processed by a second deformable offset layer in the deformable offset layers 660A. The output of the second deformable offset layer is then provided to another convolution block (if present) or directly to the first rest part of generator model 610. In particular, the deformable offset layers 660A may be interleaved with the convolution blocks 661A.

In parallel with the first path, the CBCT training image 602 may be processed in a second path by only the one or more convolution blocks 661A without passing through the deformable offset layers 660A. The convolution blocks 661A through which the CBCT training image 602 passes may be shared by the first and second paths. Specifically, the CBCT training image 602 passes in the second path through the first convolution block of the one or more convolution blocks 661A and another convolution block (if present). The output of the first convolution block is then provided to the first rest part of generator model 610. The first rest part of generator model 610 processes the images output by the first and second paths in parallel or sequentially.

First generation results 612, but not second generation results 614, may be provided to the first discriminator model 630. The first discriminator model 630 may classify the sCT image as a real CT training image or a simulated CT training image and provide the classification as detection results 632. The first generation results 612 and detection results 632 may be fed back to the first generator model 606 and first discriminator model 630 to adjust weights implemented by the first generator model 606 including those deformable offset layers 660A and those convolutional layers 661A, and first discriminator model 630. For example, first generation result 612 (e.g., an sCT image generated by first generator model 610 via the first path) and detection results 632 may be used to calculate adversarial losses.

Figure 6C:
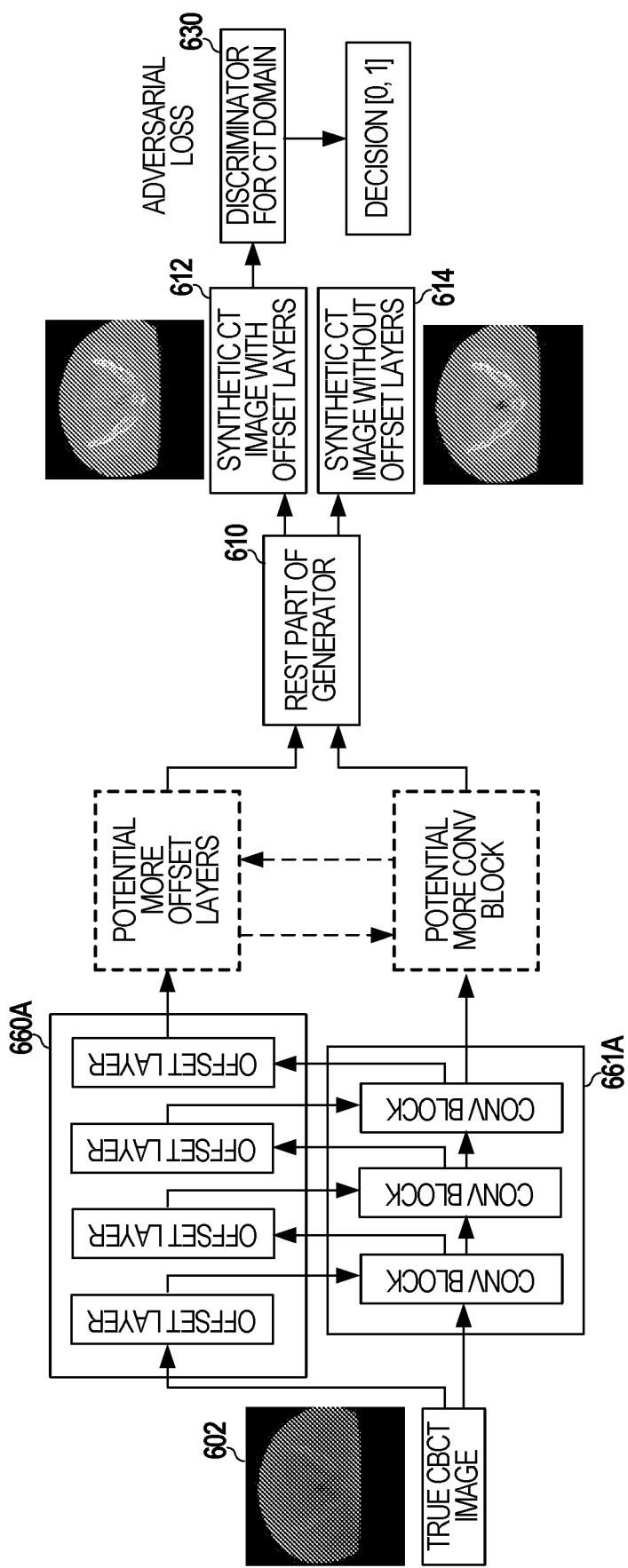

FIG. 6C shows an illustrative implementation of the first and second paths of the first portion 650. As shown, a true CBCT image 602 is received and provided to multiple deformable offset layers 660A in a first path. The CBCT image 602 passes through the deformable offset layers 660A in an interleaved manner with convolution blocks in the convolution blocks 661A. Although only four deformable offset layers 660A are shown, many more or less deformable offset layers may be utilized. The CBCT image 602 in parallel with the first path is passed via a second path through only the convolution blocks 661A without passing through the deformable offset layers 660A. Both image outputs of the first and second paths are provided to a shared first rest part of generator model 610 for being processed in parallel (e.g., by running parallel processes that implement the functions of the first rest part of generator model 610) to output corresponding sCT images as first and second generation results 612 and 614. Specifically, first generation result 612 is an sCT image produced with offset layers and second generation result 614 is an sCT image produced without offset layers. The result 612 that includes the sCT image produced with the offset layers is provided to the first discriminator model 630 for the CT domain while result 614 is not provided to the first discriminator model 630.

Referring back to FIG. 6A first generation results 612 (e.g., sCT image) may also be concurrently provided to the second generator model 608 together with the second generation results 614 via third and fourth paths, respectively. Second generator model 608 may receive first generation results 612 and generate respective simulated CBCT images as outputs. The simulated CBCT images may be referred to as cycle CBCT images 622 and may be used to compute cycle losses to adjust weights of first/second generator model 606/608. The second generator model 608 that generates the first cycle CBCT images 622 via the third path is referred to as $G_{offset}^{ct2cbct}$ and the second generator model 608 that generates the second cycle CBCT images 622 via the fourth path is referred to as $G^{ct2cbct}$. The generator $G^{ct2cbct}$ shares all network layers and weights with the generator $G_{offset}^{ct2cbct}$, and it is part of generator $G_{offset}^{ct2cbct}$, but without all those offset layers.

Specifically, the first generation results 612 may be processed in a third path by the one or more deformable offset layers 660B and the one or more convolution blocks 661B to produce the first simulated CBCT image as a first cycle-CBCT image 622. The second generation results 614 may be processed in a fourth path by the convolution blocks 661B without being processed by the deformable offset layers 660B to produce the second simulated CBCT image as a second cycle-CBCT image 622.

In the third path, the first generation results 612 may be processed by the first deformable offset layer in the deformable offset layers 660B and the output of the first deformable offset layer is provided to the first convolution block in the one or more convolution blocks 661B. The output of the first convolution block is then provided to be processed by the second deformable offset layer in the deformable offset layers 660B. The output of the second deformable offset layer is then provided to another convolution block (if present) or directly to the second rest part of generator model 620. In parallel with the third path, the second generation results 614 may be processed in a fourth path by only the one or more convolution blocks 661 without passing through the deformable offset layers 660B. The convolution blocks 661B through which the second generation results 614 pass may be shared by the third and fourth paths. Specifically, the second generation results 614 pass in the fourth path through the first convolution block of the one or more convolution blocks 661B and another convolution block (if present). The output of the first convolution block is then provided to the second rest part of generator model 620. The second rest part of generator model 620 processes the images output by the third and fourth paths in parallel or sequentially.

With the additional offset layers in the first portion 650 (in the forward direction that includes the first and second paths and the backwards direction that includes the third and fourth paths), the effects of learning unwanted structure deformation and potentially producing hallucinated structures caused by the "adversarial" loss term are decoupled from the effect of preserving original structures caused by "cycle-consistence" loss term. Namely, the additional deformable offset layers 660A and 660B in the first and third paths of the first portion 650 absorb or incorporate those shape distribution differences or other feature distribution differences between CBCT and CT image domains. Meanwhile, the second and fourth paths are restricted to perfectly preserve all true anatomy structures. In this way, the sCT image produced from the first path has similar plan-CT image appearance but also can contain those deformed structures or other hallucinated structures, while the sCT image produced by the second path strictly preserves the original true CBCT anatomy structures without any other deformed structures since it has no offset layers. Also, since the first, second, third, and fourth paths share all the processing layers except the deformable offset layers 660A and 660B, the sCT images produced by the second path have the similar plan-CT image appearance with accurate CT numbers.

Figure 6D:
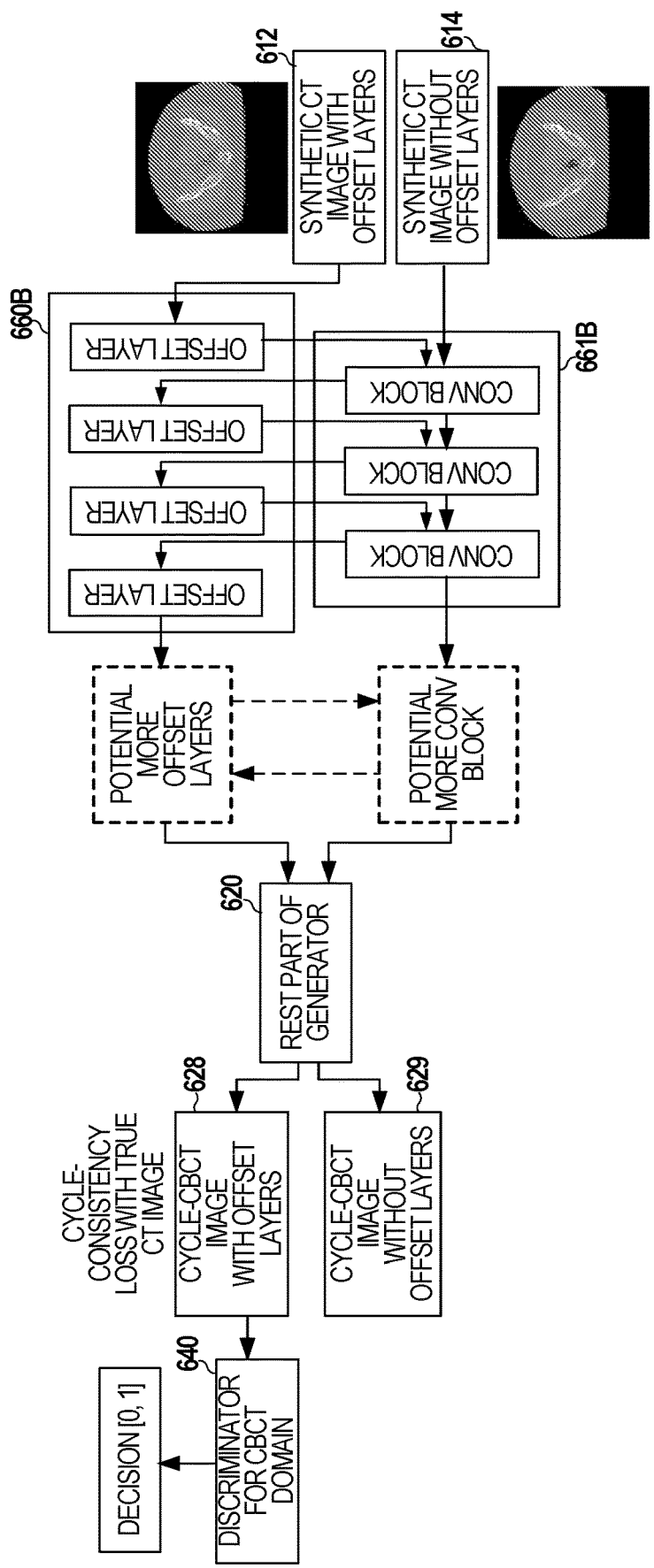

FIG. 6D shows an illustrative implementation of the third and fourth paths of the first portion 650. As shown, the sCT image produced with the offset layers (of result 612) is received and provided to multiple deformable offset layers 660B in a third path. The sCT image produced with the offset layers (of result 612) passes through the deformable offset layers 660B in an interleaved manner with convolution blocks in the convolution blocks 661B. Although only four deformable offset layers 660B are shown, many more or fewer deformable offset layers may be utilized. The sCT image produced without offset layers (of result 614) in parallel with the third path is passed via a fourth path through only the convolution blocks 661B without passing through the deformable offset layers 660B. Both image outputs of the third and fourth paths are provided to a shared second rest part of generator model 620 for being processed in parallel (e.g., by running parallel processes that implement the functions of the second rest part of generator model 620) to output corresponding Cycle-CBCT images 628 and 629. Specifically, Cycle-CBCT image 628 is produced with offset layers, and Cycle-CBCT image 629 is produced without offset layers. The Cycle-CBCT image 628 produced with the offset layers is provided to the second discriminator model 640 for the CBCT domain, while Cycle-CBCT image 629 is not provided to the second discriminator model 640.

Referring back to FIG. 6A, in an example, in second portion 652, the second generator model 608 may be trained to receive a real CT training image 604 (which may include one of image pairs 422) via fifth and sixth paths and to generate respective first and second sCBCT images (synthetic or simulated CBCT image) as first and second generation results 626 and 627. Specifically, the real CT training image 604 may be processed in a fifth path by the one or more deformable offset layers 660B and the one or more convolution blocks 661B to produce the first sCBCT image as first generation results 626. The real CT training image 604 may be processed in a sixth path by the convolution blocks 661B without being processed by the deformable offset layers 660B to produce the second sCBCT image as second generation results 627. The second generator model 608 that generates the first generation results 626 using first input interface that includes the convolution blocks 661B and deformable offset layers 660B via the fifth path is the same generator $G_{offset}^{ct2cbct}$ as that used in the first portion 650, and the second generator model 608 that generates the second generation results 627 using the second input interface that includes the convolution blocks 661B without the deformable offset layers 660B via the sixth path is the same generator $G^{ct2cbct}$ as that used in the first portion 650.

In the fifth path, the real CT training image 604 may be processed by the first deformable offset layer in the deformable offset layers 660B and the output of the first deformable offset layer is provided to a first convolution block in the one or more convolution blocks 661B. The output of the first convolution block is then provided to be processed by a second deformable offset layer in the deformable offset layers 660B. The output of the second deformable offset layer is then provided to another convolution block (if present) or directly to the second rest part of generator model 620. In particular, the deformable offset layers 660 may be interleaved with the convolution blocks 661B.

In parallel with the fifth path, the real CT training image 604 may be processed in a sixth path by only the one or more convolution blocks 661B without passing through the deformable offset layers 660B. The convolution blocks 661B through which the real CT training image 604 passes may be shared by the fifth and sixth paths. Specifically, the real CT training image 604 passes in the sixth path through the first convolution block of the one or more convolution blocks 661B and another convolution block (if present). The output of the first convolution block is then provided to the second rest part of generator model 620. The second rest part of generator model 620 processes the images output by the fifth and sixth paths in parallel or sequentially.

First generation results 626, but not second generation results 627, may be provided to the second discriminator model 640. The second discriminator model 640 may classify the sCBCT image as a real CBCT training image or a simulated CBCT training image and provide the classification as detection results 642. The first generation results 626 and detection results 642 may be fed back to the second generator model 608 and the second discriminator model 640 to adjust weights implemented by second generator model 608 and second discriminator model 640. For example, first generation result 626 (e.g., an sCBCT image generated by second generator model 620) and the detection results 642 may be used to calculate adversarial losses.

First generation results 626 (e.g., sCBCT image) may also be concurrently provided to the first generator model 606 together with the second generation results 627 via seventh and eighth paths, respectively. First generator model 606 may receive first generation results 626 and generate respective cycle-CT images 624 as outputs. The cycle-CT images 624 may be used to compute cycle losses to adjust weights of first/second generator model 606/608. The first generator model 606 that generates the cycle-CT images via the seventh path is the same generator $G_{offset}^{ct2cbct}$ as that used in the first portion 650, and the first generator model 608 that generates the cycle-CT images via the eighth path is the same generator $G^{cbct2ct}$ as that used in the first portion 650.

In some examples, "adversarial losses" may account for the classification losses for the first and second discriminator models 630 and 640. First and second discriminator models 630 and 640 may classify whether the synthetic images have similar distribution as true images or not. For cycle-consistency losses, the losses are calculated between each pair of true CBCT and Cycle-CBCT images, and each pair of true CT image and Cycle-CT image, respectively. For example, a first loss may be calculated between CBCT training image 602 and cycle-CBCT image 622 and a second loss may be calculated between real training CT image 604 and Cycle-CT image 624. The Cycle-CBCT image 622 and Cycle-CT image 624 may both be obtained by doing forward and backward cycles. Each pair of true CBCT image 602 and Cycle-CBCT image 622 may be in the same CBCT image domain and each pair of real training CT image 604 and Cycle-CT image 624 may be in the same CT image domain. The CycleGAN 600 may accordingly rely on a whole pool (or a plurality) of true or real CBCT training images 602 and a whole pool (or a plurality) of real training CT images 604 to produce synthetic CT images (sCT images) with deformable offset layers 660A applied (e.g., results 612) and without deformable offset layers applied (e.g., results 614), synthetic CBCT images (sCBCT images) with deformable offset layers 660B applied (e.g., results 626) and without deformable offset layers applied (e.g., results 627), Cycle-CBCT images 622, and Cycle-CT images 624. Based on "adversarial losses" and "cycle-consistency losses," Cycle-GAN 600 may produce sharp synthetic CT images, which have similar image resolution as real CT images. This is at least one technological improvement over one of the earlier approaches to improve image quality in a given CBCT image.

In some examples, a processor (e.g., of system 100) may apply image registration to register real CT training images to training CBCT images. This may create a one-to-one corresponding relationship between CBCT and CT images in the training data. This relationship may be referred to as paired or a pair of CBCT and CT images. In one example, CycleGAN 600 may produce one or more sCT images that preserve the exact same anatomy structure or substantially the same structure as in the corresponding CBCT images and that also have similar high image quality as real CT images, including the pixel value accuracy. In some cases, these anatomy structures may be determined from mappings of anatomical areas 424 (FIG. 4) which provide the metric representing similarity between two images. In an example, to preserve the pixel value accuracy of the sCT image, corresponding to the CBCT image (e.g., for the CBCT image to appear as a real CT image), additional constraints may be added to CycleGAN 600. These constraints may include adding pixel value losses that represent pixel value loss between sCT images and true CT images and between sCBCT images and true CBCT images. Such constraints may be part of constraints 426 (FIG. 4). These constraints that directly link sCT images with corresponding CT images may be represented by the following pixel value loss term (pixel based loss term):

sCT-CT $L1$ term: $E_{x \sim p(CBCT), y \sim p(CT)} \| G^{cbct2ct}(x) - y \|_1$.

where x, y are paired CBCT and real CT images, $G^{cbct2ct}$ is the first generator model 606 that includes the input interface with the convolution blocks 661A and without the deformable offset layers 660A (e.g., the CBCT to sCT generator, $G^{cbct2ct}$), E represents the expectation for the L1 differences between all sCT images and corresponding true CT images, and $G^{cbct2ct}(x)$ is the second sCT image. The value for E may be retrieved from storage device 116, an external data source, human input, and/or may be updated continuously as additional sCT and sCBCT images are generated.

Another pixel value loss term may also be added as a constraint to directly link sCBCT images with corresponding CBCT images may be represented by the following pixel value loss term:

sCBCT-CBCT $L1$ term: $E_{x \sim p(CBCT), y \sim p(CT)} \| G^{ct2cbct}(y) - x \|_1$, where x, y are paired CBCT and CT images, $G^{ct2cbct}$ is the second generator model 608 that includes the input interface with the convolution blocks 661B and without the deformable offset layers 660B (the real CT to sCBCT generator, $G^{ct2cbct}$), and $G^{ct2cbct}(x)$ is the second sCBCT image.

These two pixel value loss terms (L1-norm terms) compare the sCT images with the corresponding true CT images and the sCBCT images with the corresponding true CBCT images. By minimizing or reducing these two L1-norm terms, the synthetic images will be more likely to match the pixel values with the targeted true/real images. More specifically, for example, by minimizing or reducing the sCT-CT L1-norm term, the produced sCT images can be forced to have, or are more likely to have, pixel-level accuracy and similarities with the corresponding CT images. This may provide a technological improvement over conventional systems since the absolute pixel values in medical images can represent some specific physical measurements or quantities. For example, the CT pixel values contain information about electron density, which is useful for radiation dose calculation. As another example, radiotherapy system 100 may more accurately direct radiotherapy or radiation towards a target region in a subject.

In another example, a metric, such as a weight, may be added to the pixel-based loss term (e.g., to account for situations where the paired images are not perfectly aligned). Such a metric may be retrieved from constraints 426. The metric may be generated using a predetermined assigned weight, a universal quality index (UQI), local cross correlation, or using any other technique that measures similarity or other relationship between two images. For purposes of this disclosure, the metric used to measure relationship between the two images is an SSIM weight, but any other metric may be used. For example, an SSIM weighted L1-norm approach can be used to compensate for imperfect matching of paired CBCT-CT images. In particular, by minimizing or reducing the sCT-CT L1-norm term, Cycle-GAN 600 can enforce a constraint that the sCT images match the pixel values with the targeted true CT images. If all or substantially all of the paired CBCT-CT images are perfectly aligned, the targeted true CT images may have the same anatomy structures as the CBCT images. In such circumstances, the generated sCT images may also preserve the same anatomy structures in CBCT images. In some cases, the CBCT and CT images that are paired may not be perfectly aligned (e.g., because some anatomy structures (especially for some organs or soft tissues) of patients have changed between taking the CBCT image and the corresponding real CT image). In these cases, minimizing or reducing the sCT-CT and/or sCBCT-CBCT L1-loss terms may introduce errors into the trained generator and discriminator models (e.g., by enforcing generated synthetic CT images to match the corresponding CT images in those misaligned areas) causing some distortion in the generated images. One way to eliminate/suppress/reduce the potential distortion effects is with the addition of SSIM weights for the sCT-CT and sCBCT-CBCT pixel based loss terms, such as:

SSIM weighted sCT-CT $L1$ term: $E_{x\sim p(CBCT),y\sim p(CT)}$ SSIM$(x,y) \cdot \|G^{cbct2ct}(x) - y\|_1$ and SSIM weighted sCBCT-CBCT $L1$ term:
$E_{x\sim p(CBCT),y\sim p(CT)}$ SSIM$(x,y) \cdot \|G^{ct2cbct}(y) - x\|_1$ In some implementations, the weight (SSIM(x,y)) may be a map (e.g., anatomical areas 424), which has the same size or substantially the same size as the paired CBCT and CT images. Each pixel value in SSIM(x,y) may represent the similarity level between the pairs of original CBCT and corresponding real CT image at the same pixel location. The pixel value range for SSIM may range from 0 to 1 (although other ranges are possible). The value of 1 may represent perfect structure similarity, which indicates the CBCT and the corresponding real CT images are well aligned at the image location, while 0 may represent the least structure similarity. For example, for every pair of CBCT and real CT images (e.g., for every pair of CBCT and real CT images stored in storage device 116), an SSIM map/image may be calculated (e.g., by processor of system 100). The SSIM map may be computed by computing system 110 upon forming a given pair of training images or after the threshold number of the training images has been obtained and stored. The computing system 110 may use image modelling to determine for every pixel a probability that the CBCT and real CT image pairs are aligned and store that probability or update the SSIM value for that pixel with the determined probability. In some implementations, this probability value may be input by a human operator or guided by a physician. The SSIM weighted sCT-CT pixel-based loss term may mean that if a pair of pixels between a pair of CBCT and real CT have a high SSIM value (close to 1) with strong similarity, then by minimizing the SSIM weighted L1-norm term, CycleGAN 600 may cause the sCT image to match the targeted CT image (e.g., because the similarity weight between the CBCT and CT image is large). On the other hand, if a pair of pixels between a pair of CBCT and real CT have a low SSIM value (close to 0), then by minimizing or reducing the SSIM weighted L1-norm term, CycleGAN 600 may avoid having the synthetic CT image match the target CT (e.g., because the weight is already small (close to 0)). In particular, the likelihood that the pixel value loss term is minimized or reduced at a given pixel location is decreased when the weight of the map indicates a low level of similarity between the pair of CT/CBCT images. This reduces the impact on the sCT of the difference between the two images at the pixel location. Also, the likelihood that the pixel value loss term is minimized or reduced at a given pixel location is increased when the weight of the map indicates a high level of similarity between the pair of CT/CBCT images. This increases the impact on the sCT of the difference between the two images at the pixel location. The SSIM weights provide a mechanism of enforcing different levels of strengths on sCT images to match the targeted real CT images on a pixel-by-pixel level.

Similarly, the SSIM weighted sCBCT-CBCT pixel based loss term may mean that, if a pair of pixels between a pair of CBCT and real CT have a high SSIM value (close to 1) with strong similarity, then by minimizing the SSIM weighted L1-norm term, CycleGAN 600 may cause the sCBCT image to match the targeted CBCT image (e.g., because the similarity weight between the CBCT and CT image is large). On the other hand, if a pair of pixels between a pair of CBCT and real CT have a low SSIM value (close to 0), then by minimizing or reducing the SSIM weighted L1-norm term, CycleGAN 600 may avoid having the synthetic CBCT image match the target CBCT (e.g., because the weight is already small (close to 0)). In particular, the likelihood that the pixel value loss term is minimized or reduced at a given pixel location is decreased when the weight of the map indicates a low level of similarity between the pair of CT/CBCT images. This reduces the impact on the sCBCT of the difference between the two images at the pixel location. Also, the likelihood that the pixel value loss term is minimized or reduced at a given pixel location is increased when the weight of the map indicates a high level of similarity between the pair of CT/CBCT images. This increases the impact on the sCBCT of the difference between the two images at the pixel location. The SSIM weights provide a mechanism of enforcing different levels of strengths on sCBCT images to match the targeted real CBCT images on a pixel-by-pixel level.

In another example, a thresholded SSIM weighted L1-norm approach can be used. This threshold value may be retrieved from constraints 426 (FIG. 4). In particular, a threshold can be placed on SSIM weights to select high similarity areas between the paired CBCT and real CT images and to ignore the low similarity areas. For example, when the weight values of SSIM(x,y) are less than a threshold a (a hyper-parameter), all those weights may be set to be zero (e.g., the weight may be ignored, thereby decreasing the likelihood that the loss term is reduced or minimized). For such areas, the sCT is not forced to match with CT image because the weights are zero (information for those difference between two images may not be available). As such, since weight=0, multiply the difference=0, meaning the differences between two images at those pixels have no impact. Instead, the process relies on the adversarial loss and cycle-consistency loss to recover those pixel areas. When the weight values are greater than or equal to the threshold a (the hyper-parameter), the weights have the same effect as discussed above on the pixel-based loss value. This thresholded SSIM-weighted L1-norm can be expressed as:

$$SSIM_{T_a}(x, y, \alpha) = \begin{cases} SSIM(x, y) & \text{if } SSIM(x, y) > \alpha \\ 0 & \text{otherwise} \end{cases}$$

Since the sCT images produced by the paths with the deformable offset layers (e.g., the first and third paths) can include deformed structures or potential other artificial structures, the SSIM weighted L1-norm is placed only on the sCT images produced by the generators in the paths that do not include the deformable offset layers (e.g., the second and fourth paths) which strictly preserve all original anatomy structures in the CBCT images. As such, the thresholded SSIM-weighted L1 sCT-CT pixel based loss term can be expressed as:

Threshold SSIM weighted sCT-CT $L1$ term:
$E_{x\sim p(CBCT),y\sim p(CT)}$ SSIM$_{T_a}(x,y) \cdot \|G^{cbct2ct}(x) - y\|_1$ The thresholded SSIM-weighted L1 sCBCT-CBCT term can be expressed as:

Threshold SSIM weighted sCBCT-CBCT $L1$ term:
$$E_{x\sim p(CBCT), y\sim p(CT)} SSIM_{T_a}(x,y) \cdot \|G^{ct2cbct}(x)-y\|_1$$

A range of hyper-parameter a can be set between 0 and 1. In some examples, the value of hyper-parameter a may be set to be 0.5 or 0.6. The additional thresholded SSIM weighted L1-norm terms are only placed on the generators without the offset layers (e.g., the generators of the second and fourth paths) and can be expressed as:

Threshold SSIM weighted L1 Terms: $L_{SSIM}=$
$$E_{x\sim p(CBCT), y\sim p(CT)} SSIM_{T_a}(x,y) \cdot \|G^{ct2cbct}(x)-y\|_1 + $$
$$E_{x\sim p(CBCT), y\sim p(CT)} SSIM_{T_a}(x,y) \cdot \|G^{ct2cbct}(y)-\|_1$$

In some implementations, CycleGAN 600 may be implemented to generate a sCT image in accordance with an objective function that includes an adversarial loss term, a cycle consistency loss term, and a pixel based loss term (L1-norm term). The pixel based loss term may be weighted (e.g., SSIM weighted) and/or thresholded weighted. The adversarial losses may be determined using first/second generator models 610/620 and first/second discriminator models 630/640 and may be expressed as:

Adversarial losses: $L_{GANs} = L_{GAN}(G_{offset}^{ct2cbct}, D_{ct}, x, y) + L_{GAN}(G_{offset}^{ct2cbct}, D_{cbct}, y, x)$ where:

$L_{GAN}(G_{offset}^{ct2cbct}, D_{ct}, x, y) = E_{x\sim p(CBCT)}[D_{ct}(G_{offset}^{ct2cbct}(x))]^2 + E_{y\sim p(CT)}[D_{ct}(y)-1]^2$ $L_{GAN}(G_{offset}^{ct2cbct}, D_{ct}, y, x) = E_{y\sim p(CT)}[D_{cbct}(G_{offset}^{ct2cbct}(y))]^2 + E_{y\sim p(CBCT)}[D_{cbct}(x)-1]^2$ $D_{ct}$ is the first discriminator model which determines whether one image is a true CT or sCT image. $D_{cbct}$ is the second discriminator model which determines whether one image is a true CBCT or sCBCT image.

In some embodiments, a single-scale SSIM metric is adopted to evaluate the structure similarities between two images (between sCT and corresponding CT images). In such cases, instead of using the single-scale version of SSIM metrics, the disclosed embodiments can also adopt a multi-scale version of SSIM metrics (MS-SSIM) to evaluate the structure similarities between two images. The multi-scale version of the SSIM metrics use low-pass filters and down-sampling to obtain multiple SSIM at different resolutions or view levels.

Cycle-consistence losses are applied on both generators $G_{offset}^{cbct2ct}$ and $G_{offset}^{ct2cbct}$ in the first, second, third, fourth, fifth, sixth, seventh, and eighth paths. Such cycle consistency loss term may be determined using images 622 and 624 and may be expressed as:

$$L_{CYC}(G_{offset}^{cbct2ct}, G_{offset}^{ct2cbct}, G^{cbct2ct}, G^{ct2cbct}, x, y) =$$
$$E_{x\sim p(CBCT)} \|G_{offset}^{ct2cbct}(G_{offset}^{ct2cbct}(x)) - x\|_1 +$$
$$E_{y\sim p(CT)} \|G_{offset}^{ct2cbct}(G_{offset}^{ct2cbct}(y)) - y\|_1 +$$
$$E_{x\sim p(CBCT)} \|G^{ct2cbct}(G^{cbct2ct}(x)) - x\|_1 +$$
$$E_{y\sim p(CT)} \|G^{cbct2ct}(G^{ct2cbct}(y)) - y\|_1$$

The disclosed embodiments only apply "adversarial" losses on generators $G_{offset}^{cbct2ct}$ and $G_{offset}^{ct2cbct}$ (e.g., the generators in the first, third, fifth and seventh paths), and apply "cycle-consistence" losses on all generators (e.g., $G_{offset}^{cbct2ct}$, $G_{offset}^{ct2cbct}$, and $G^{cbct2ct}$, $G^{ct2cbct}$). The effect of minimizing the "cycle-consistence" loss terms is to preserve original structures and to avoid unnecessary structure deformation, and the effect of minimizing the "adversarial" loss terms is to learn a mapping or distribution conversion from one domain to its opponent's domain. Unlike prior single-generator approaches, two different generators are provided in each direction (e.g., two generators, one for each of the first and second paths and two generators, one for each of the third and fourth paths). One generator is provided with offset layers (such as $G_{offset}^{cbct2ct}$ in the first path), and one without offset layers (such as $G^{cbct2ct}$ in the second flow). In addition, the generators share weights and other modules with all other layers (except those offset layers). By combining these two loss terms on separate generators, the loss terms are decoupled and will not compete with each other. Namely, by minimizing the "cycle-consistence" loss terms, the sCT images produced by the generator $G^{cbct2ct}$ without offset layers in the second paths preserves all true anatomy structures existing in original CBCT images. Meanwhile, because of the "adversarial" losses are placed on the generator $G_{offset}^{cbct2ct}$, the offset layers will be trained to accommodate all unwanted shape deformation or potential produced hallucinated structures, and all other layers will not introduce shape deformation or other potential hallucinated structures. Instead, the generator $G^{cbct2ct}$ produces sCT images with true original anatomy structures. This is because all other layers are shared with generator $G^{cbct2ct}$ by the generator $G_{offset}^{cbct2ct}$, thus they are be governed by the "cycle-consistence" loss terms at the same time. Based on this approach, the disclosed techniques can successfully decouple the two different effects caused by "adversarial" and "cycle-consistence" loss terms. Therefore, when the shape distribution or other feature distribution in CT images largely differ with that of the original CBCT images, the sCT images produced by the generator $G^{cbct2ct}$ can still preserve true original anatomy structures existing in original CBCT images.

Accordingly, the total objective function can be expressed as: Total loss: $L_{total} = L_{GANs} + \lambda_1 \cdot L_{CYC} + \lambda_2 * L_{SSIM}$, where $\lambda_1$, $\lambda_2$ control the relative strengths of the two losses, respectively.

CycleGAN 600 may train first and second generators 610/620 in accordance with:

$$G_{offset}^{cbct2ct}, G_{offset}^{ct2cbct} = \arg \min_{G_{offset}^{cbct2ct}, G_{offset}^{ct2cbct}}$$
$$\max_{D_{ct}, D_{cbct}} L_{total}(G_{offset}^{cbct2ct}, G_{offset}^{ct2cbct}, G^{cbct2ct}, G^{ct2cbct}, D_{ct}, D_{cbct}),$$

which can be done by some common optimization algorithms used in the deep learning field, such as stochastic gradient descent, Adam's method, or other popular methods. Once the generator $G_{offset}^{cbct2ct}$ is obtained, the generator $G^{cbct2ct}$ is also obtained since $G^{cbct2ct}$ is part of generator $G_{offset}^{cbct2ct}$.

In some implementations, after being trained using Cycle-GAN 600, first generator model 606 that includes the input interface with the convolution blocks 661A without the deformable offset layers 660A may be used in system 100 to generate sCT images from acquired CBCT images. Other components of CycleGAN 600 may be excluded from system 100.

The preceding examples provide an example of how a GAN or CycleGAN may be trained based on CT and CBCT image pairs, specifically from image data in 2D image slices in multiple parallel or sequential paths. It will be understood that the GAN or CycleGAN may process other forms of image data (e.g., 3D, or other multi-dimensional images). Further, although only grayscale (including black and white) images are depicted by the accompanying drawings, it will be understood that color images may be generated and/or processed by the GAN, as discussed in the examples below.

Figure 7:
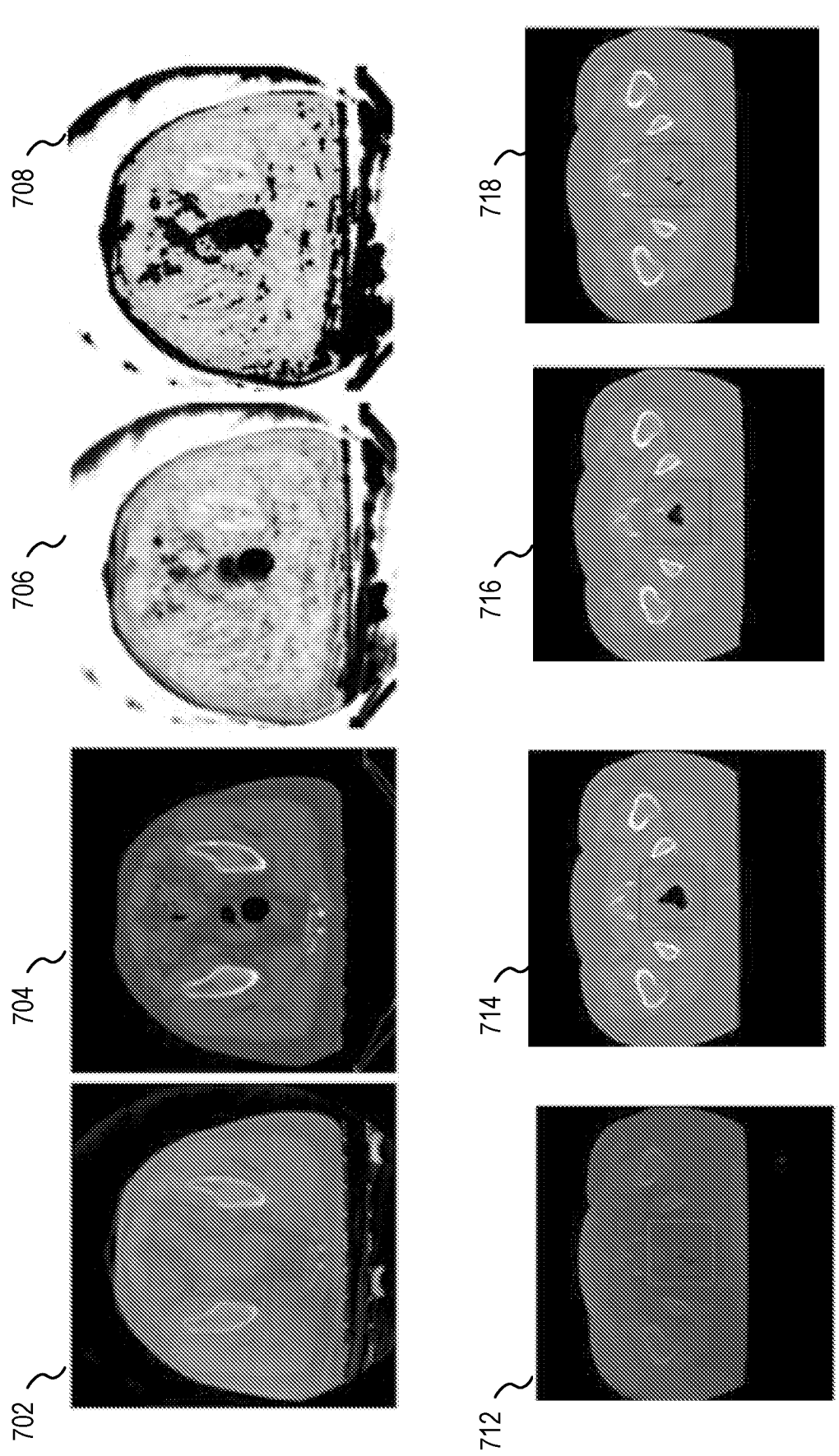
FIG. 7 illustrates variations of anatomical area information and input images used in connection with training and generating a sCT image from a received CBCT image according to some examples of the disclosure.

FIG. 7 illustrates a pair of CBCT and real CT input images used in connection with training and generating sCT image model. In FIG. 7, image 702 shows an input CBCT image that is paired with a real CT image 704. Image 706 represents an image used as a map of anatomical areas 424 to provide the image similarity metric (e.g., the SSIM weight), and image 708 is an image used as a map of anatomical areas 424 to provide the thresholded similarity metric (e.g., the thresholded-SSIM weight). After the generator of the Cycle-GAN has been trained, a new CBCT image 712 may be received. A conventional CycleGAN may process the new CBCT image 712 and output an sCT image 714. As compared with the registered CT image 716, the conventionally produced sCT image 714 includes a large mismatch in the structures shown in the region boxed in images 714 and 716. To improve the quality of the sCT image output of the CycleGAN, the CycleGAN or GAN model trained, via multiple paths (e.g., the first, second, third, fourth, fifth, sixth, seventh and eighth paths) in accordance with the disclosed techniques, generates an improved sCT image 718 that correctly preserves the fine structures of the CBCT image 712 which were incorrectly represented by the conventionally produced sCT image 714.

Figure 8:
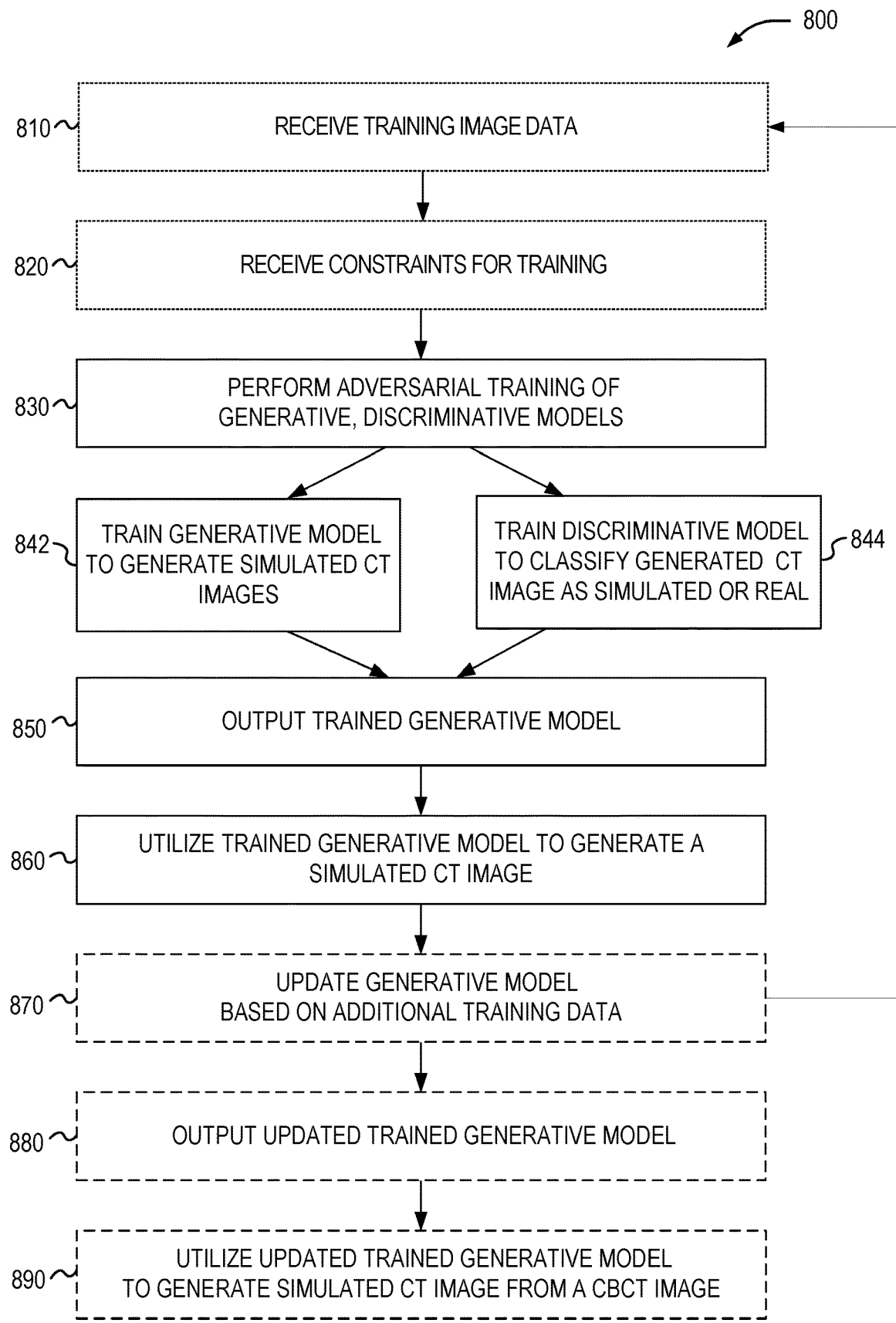
FIG. 8 illustrates a flowchart of exemplary operations for training a generative model adapted for outputting a sCT image from a received CBCT image according to some examples of the disclosure.

FIG. 8 illustrates a flowchart of a process 800 of exemplary operations for training a generative model adapted for outputting a sCT image from an input CBCT image via multiple parallel or sequential paths. The process 800 is illustrated from the perspective of a radiotherapy system 100, which trains and utilizes a generative model using a GAN or CycleGAN as discussed in the preceding examples. However, corresponding operations may be performed by other devices or systems (including in offline training or verification settings separate from a particular image processing workflow or medical treatment).

As shown, a first phase of the flowchart workflow begins with operations (810, 820) to establish the parameters of training and model operations. The process 800 begins with operations to receive (e.g., obtain, extract, identify) training image data (operation 810) and constraints or conditions for training (operation 820). In an example, this training image data may comprise image data from a plurality of human subjects, relating to a particular condition, anatomical feature, or anatomical area—such as pairs of CBCT and real CT images of a target region. Also in an example, the constraints may relate to an imaging device, a treatment device, a patient, or medical treatment considerations. In an example, these constraints may include adversarial losses, cycle-consistency based losses, and a pixel-based value loss term (or weighted and/or thresholded weighted pixel-based loss term).

The second phase of the process 800 continues with training operations, including adversarial training of generative and discriminative models in a generative adversarial network (operation 830). In an example, the adversarial training includes training the generative model to generate first and second simulated CT images by processing an input CBCT image (operation 842) via first and second paths (e.g., a first path that includes an input interface that includes deformable offset layers and convolution blocks and a second path that includes the an input interface that includes the same convolution blocks in the first path but without those offset layers). The first simulated CT image produced via the first path is provided to a discriminative model to train the discriminative model to classify the generated simulated CT image as simulated or real training data (operation 844). Also in this adversarial training, the output of the generative model is used for training the discriminative model, and the output of the discriminative model is used for training the generative model. The first and second simulated CT images are respectively passed to a second generator model via third and fourth paths. The third path includes an input interface that includes deformable offset layers and convolution blocks and a fourth path that includes an input interface includes the same convolution blocks in the third path but without those offset layers. The third and fourth paths pass through a shared rest part of the second generative model to generate Cycle CBCT images from the first and second simulated CT images processed with and without deformable offset layers respectively. The Cycle CBCT images are used in loss terms for training the generative model.

In various examples, the generative model and the discriminative model comprise respective convolutional neural networks (e.g., as discussed with reference to FIGS. 3A and 3B respectively above). In further examples, the generative adversarial network is a cycle generative adversarial network (e.g., as discussed with reference to FIG. 6 above) where multiple generative and adversarial models are employed and the output from one generative model is provided as an input to a second generative model.

The process 800 continues with the output of the generative model for use in generating a sCT image (operation 850), as the generative model is adapted to generate a sCT image based on an input CBCT image of a subject. The generative model may be employed in any component in system 100 to enhance CBCT images or perform image processing. In some implementations, the generative model may be added to system 100 from an external source (e.g., a third-party vendor).

The process 800 continues with the utilization of the trained generative model to generate a sCT image (operation 860) based on an input CBCT image of a subject. The generative model may be employed in any component in system 100 to enhance CBCT images or perform image processing. In some implementations, the generative model may be added to system 100 from an external source (e.g., a third-party vendor).

The process 800 concludes with a final phase to implement updates to the generative model, including updating the generative model based on additional training data (operation 870) and outputting the updated trained generative model (operation 880). In various examples, the updating may be produced in connection with the receipt of additional training image data and constraints (e.g., in a manner similar to operations 810, 820), or the performance of additional adversarial training (e.g., in a manner similar to operations 830, 842, 844). In further examples, the generative model may be specifically updated based on approval, changes, or use of the sCT images (e.g., resulting from modification, verification, or changes to the image data by a medical professional). The flowchart concludes with the use of the updated trained generative model (operation 890), such as may be performed in uses of the updated generative model for subsequent radiotherapy treatments.

As discussed above with reference to FIGS. 6 and 8, the generative adversarial network may be a cycle generative adversarial network comprising the generative model and a discriminative model.

As previously discussed, respective electronic computing systems or devices may implement one or more of the methods or functional operations as discussed herein. In one or more embodiments, the radiotherapy processing computing system 110 may be configured, adapted, or used to control or operate the image-guided radiation therapy device 202, perform or implement the training or prediction operations from model 300, operate the trained generator model 460, perform or implement the data flows 500, 550 perform or implement the operations of the process 800, or perform any one or more of the other methodologies discussed herein (e.g., as part of image processing logic 120 and the workflows 130, 140). In various embodiments, such electronic computing systems or devices operates as a standalone device or may be connected (e.g., networked) to other machines. For instance, such computing systems or devices may operate in the capacity of a server or a client machine in server-client network environment, or as a peer machine in a peer-to-peer (or distributed) network environment. Features of computing systems or devices may be embodied by a personal computer (PC), a tablet PC, a Personal Digital Assistant (PDA), a cellular telephone, a web appliance, or any machine capable of executing instructions (sequential or otherwise) that specify actions to be taken by that machine.

As also indicated above, the functionality discussed above may be implemented by instructions, logic, or other information storage on a machine-readable medium. While the machine-readable medium may have been described in various examples with reference to be a single medium, the term "machine-readable medium" may include a single medium or multiple media (e.g., a centralized or distributed database, and/or associated caches and servers) that store the one or more transitory or non-transitory instructions or data structures. The term "machine-readable medium" shall also be taken to include any tangible medium that is capable of storing, encoding or carrying transitory or non-transitory instructions for execution by the machine and that cause the machine to perform any one or more of the methodologies of the present inventive subject matter, or that is capable of storing, encoding, or carrying data structures utilized by or associated with such instructions.

The above detailed description includes references to the accompanying drawings, which form a part of the detailed description. The drawings show, by way of illustration but not by way of limitation, specific embodiments in which the inventive subject matter can be practiced. These embodiments are also referred to herein as "examples." Such examples can include elements in addition to those shown or described. However, this disclosure also contemplates examples in which only those elements shown or described are provided. Moreover, the disclosure also contemplates examples using any combination or permutation of those elements shown or described (or one or more aspects thereof), either with respect to a particular example (or one or more aspects thereof), or with respect to other examples (or one or more aspects thereof) shown or described herein.

All publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

In this document, the terms "a," "an," "the," and "said" are used when introducing elements of aspects of the inventive subject matter or in the embodiments thereof, as is common in patent documents, to include one or more than one or more of the elements, independent of any other instances or usages of "at least one" or "one or more." In this document, the term "or" is used to refer to a nonexclusive or, such that "A or B" includes "A but not B," "B but not A," and "A and B," unless otherwise indicated.

In the appended claims, the terms "including" and "in which" are used as the plain-English equivalents of the respective terms "comprising" and "wherein." Also, in the following claims, the terms "comprising," "including," and "having" are intended to be open-ended to mean that there may be additional elements other than the listed elements, such that after such a term (e.g., comprising, including, having) in a claim are still deemed to fall within the scope of that claim. Moreover, in the following claims, the terms "first," "second," and "third," etc., are used merely as labels, and are not intended to impose numerical requirements on their objects.

The present inventive subject matter also relates to a computing system adapted, configured, or operated for performing the operations herein. This system may be specially constructed for the required purposes, or it may comprise a general purpose computer selectively activated or reconfigured by a computer program (e.g., instructions, code, etc.) stored in the computer. The order of execution or performance of the operations in embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the inventive subject matter.

In view of the above, it will be seen that the several objects of the inventive subject matter are achieved and other advantageous results attained. Having described aspects of the inventive subject matter in detail, it will be apparent that modifications and variations are possible without departing from the scope of aspects of the inventive subject matter as defined in the appended claims. As various changes could be made in the above constructions, products, and methods without departing from the scope of aspects of the inventive subject matter, it is intended that all matter contained in the above description and shown in the accompanying drawings shall be interpreted as illustrative and not in a limiting sense.

The examples described herein may be implemented in a variety of embodiments. For example, one embodiment includes a computing device including processing hardware (e.g., a processor or other processing circuitry) and memory hardware (e.g., a storage device or volatile memory) including instructions embodied thereon, such that the instructions, which when executed by the processing hardware, cause the computing device to implement, perform, or coordinate the electronic operations for these techniques and system configurations. Another embodiment discussed herein includes a computer program product, such as may be embodied by a machine-readable medium or other storage device, which provides the transitory or non-transitory instructions to implement, perform, or coordinate the electronic operations for these techniques and system configurations. Another embodiment discussed herein includes a method, operable on processing hardware of the computing device, to implement, perform, or coordinate the electronic operations for these techniques and system configurations.

In further embodiments, the logic, commands, or transitory or non-transitory instructions that implement aspects of the electronic operations described above, may be provided in a distributed or centralized computing system, including any number of form factors for the computing system such as desktop or notebook personal computers, mobile devices such as tablets, netbooks, and smartphones, client terminals and server-hosted machine instances, and the like. Another embodiment discussed herein includes the incorporation of the techniques discussed herein into other forms, including into other forms of programmed logic, hardware configurations, or specialized components or modules, including an apparatus with respective means to perform the functions of such techniques. The respective algorithms used to implement the functions of such techniques may include a sequence of some or all of the electronic operations described above, or other aspects depicted in the accompanying drawings and detailed description below.

The above description is intended to be illustrative, and not restrictive. For example, the above-described examples (or one or more aspects thereof) may be used in combination with each other. In addition, many modifications may be made to adapt a particular situation or material to the teachings of the inventive subject matter without departing from its scope. While the dimensions, types of materials and example parameters, functions, and implementations described herein are intended to define the parameters of the inventive subject matter, they are by no means limiting and are exemplary embodiments. Many other embodiments will be apparent to those of skill in the art upon reviewing the above description. The scope of the inventive subject matter should, therefore, be determined with reference to the appended claims, along with the full scope of equivalents to which such claims are entitled.

Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment. The scope of the inventive subject matter should be determined with reference to the appended claims, along with the full scope of equivalents to which such claims are entitled.

What is claimed is:

1. A computer-implemented method for generating a synthetic computed tomography (sCT) image from a cone-beam computed tomography (CBCT) image, the method comprising:
   receiving a CBCT image of a subject;
   generating, using a first generative model, a sCT image corresponding to the CBCT image, the first generative model trained based on one or more deformable offset layers in a generative adversarial network (GAN) to process the CBCT image as an input and provide the sCT image as an output, the first generative model trained in a cycle generative adversarial network (CycleGAN) comprising a second generative model, wherein the second generative model:
   receives a real computed tomography (CT) image and outputs first and second synthetic CBCT (sCBCT) images, the real CT image being paired with a training CBCT image, the first sCBCT image generated with application of a set of deformable offset layers and the second sCBCT image generated without application of the set of deformable offset layers, the first generative model to receive the first and second sCBCT images to generate first and second cycle CT images for calculating cycle-consistency losses, the first cycle CT image generated with application of the one or more deformable offset lavers and the second cycle CT image generated without application of the one or more deformable offset layers; and
   generating a display of the sCT image for medical analysis of the subject.

2. The method of claim 1, wherein:
   the generative adversarial network is configured to train the first generative model using a discriminative model;
   values applied by the first generative model and the discriminative model are established using adversarial training between the discriminative model and the first generative model; and
   the first generative model and the discriminative model comprise respective convolutional neural networks.

3. The method of claim 2, wherein:
   the adversarial training comprises:
   training the first generative model to generate a first sCT image from a given CBCT image by applying a first set of the one or more deformable offset layers to the given CBCT image;
   training the first generative model to generate a second sCT image from the given CBCT image without applying the first set of the one or more deformable offset layers to the given CBCT image; and
   training the discriminative model to classify the first sCT image as a synthetic or a real CI image, and
   the output of the first generative model is used for training the discriminative model and an output of the discriminative model is used for training the first generative model.

4. The method of claim 3, wherein the CycleGAN comprises the first generative model and the discriminative model, wherein the discriminative model is a first discriminative model, wherein the CycleGAN further comprises:
   the second generative model trained to:
   process a given CT image as an input;
   provide a first synthetic sCBCT image as an output by applying a second set of the one or more deformable offset layers to the given CT image; and
   provide a second sCBCT image as an output without applying the second set of the one or more deformable offset layers to the given CT image; and
   a second discriminative model trained to classify the first synthetic sCBCT image as a synthetic or a real CBCT image.

5. The method of claim 4, wherein the CycleGAN comprises a first portion to train the first generative model, wherein the first generative model includes first and second input interfaces and a first shared generator portion, wherein the second generative model includes third and fourth input interfaces and a second shared generator portion, the first portion being trained to:
   transmit the training CBCT image to an input of the first generative model via first and second paths to output the first and second sCT images, respectively, the first path comprising the first input interface including the first set of the one or more deformable offset layers and a first set of one or more convolution layers, the second path comprising second input interface including the first set of the one or more convolution layers without the first set of the one or more deformable offset layers;

receive the first sCT image at the input of the first discriminative model to classify the first sCT image as the synthetic or the real CT image; and receive the first and second sCT images at an input of the second generative model via third and fourth paths to generate first and second cycle CBCT images, respectively, for calculating cycle-consistency losses, the third path comprising the third input interface including a second set of the one or more deformable offset layers and a second set of the one or more convolution layers, the fourth path comprising the fourth input interface including the second set of the one or more convolution layers without the second set of the one or more deformable offset layers.

6. The method of claim 5, wherein the CycleGAN comprises a second portion that is trained to:
receive the first synthetic CBCT image at the input of the second discriminative model to classify the first synthetic CBCT image as a synthetic or real CBCT image.

7. The method of claim 6, wherein:
the cycle-consistency losses being generated based on a comparison of the first and second cycle CBCT images with the training CBCT image and a comparison of the first and second cycle CT images with the real CT image;
the first generative model is trained to minimize or reduce a first pixel-based loss term using the second sCT image, the first pixel-based loss term represents an expectation of difference between a plurality of synthetic CT images and respectively paired real CT images; and
the second generative model is trained to minimize or reduce a second pixel-based loss term using the second sCBCT image, the second pixel-based loss term representing an expectation of difference between a plurality of sCBCT images and respectively paired real CBCT images.

8. The method of claim 7, wherein:
the CycleGAN is trained to apply a metric to the first and second pixel-based loss terms, the metric generated based on a map having a same size as a pair of a CBCT images and real CT images, such that each pixel value in the map represents a similarity level between a given CBCT image and a given real CT image that is paired with the given CBCT image; and
the CycleGAN is trained to apply a threshold to the metric such that when the similarity level exceeds the threshold, the metric is applied to the first and second pixel-based loss terms and otherwise a zero value is applied to the first and second pixel-based loss terms.

9. The method of claim 8, wherein the CycleGAN is trained to apply one of a plurality of metrics to the first and second pixel-based loss terms, the metrics being generated using low-pass filtering and down-sampling of the paired CBCT and CT images at different image resolutions or view levels.

10. The method of claim 9, wherein the one or more deformable offset layers are trained based on adversarial training to change a sampling amount, introduce coordinate offsets, and resample images using interpolation in order to store or absorb deformed structure information between the paired CBCT and CT images.

11. A computer-implemented method for training a model to generate a synthetic computed tomography (sCT) image from a cone-beam computed tomography (CBCT) image, the method comprising:
receiving a CBCT image of a subject as an input of a first generative model; and
training the first generative model, via first and second paths, in a generative adversarial network (GAN) to process the CBCT image to provide first and second synthetic computed tomography (sCT) images corresponding to the CBCT image as outputs of the first generative model, the first path comprising a first set of one or more deformable offset layers and a first set of one or more convolution layers, the second path comprising the first set of the one or more convolution layers without the first set of the one or more deformable offset layers, the first generative model trained in a cycle generative adversarial network (CycleGAN) comprising a second generative model, wherein the second generative model:
receives a real computed tomography (CT) image and outputs first and second synthetic CBCT (sCBCT) images, the real CT image being paired with a training CBCT image, the first sCBCT image generated with application of a set of deformable offset layers and the second sCBCT image generated without application of the set of deformable offset layers, the first generative model to receive the first and second sCBCT images to generate first and second cycle CT images for calculating cycle-consistency losses, the first cycle CT image generated with application of the one or more deformable offset layers and the second cycle CT image generated without application of the one or more deformable offset layers.

12. The method of claim 11, wherein the CycleGAN comprises the first generative model and a first discriminative model, further comprising:
training the second generative model to process produced first and second sCT images as inputs and provide first and second cycle-CBCT images as outputs via third and fourth paths, respectively, the third path comprising a second set of the one or more deformable offset layers and a second set of the one or more convolution layers, the fourth path comprising the second set of the one or more convolution layers without the second set of the one or more deformable offset layers; and
training a second discriminative model to classify the first cycle-CBCT image as a synthetic or a real CBCT image.

13. The method of claim 12, wherein the CycleGAN comprises first and second portions to train the first generative model, further comprising:
transmitting the training CBCT image to the input of the first generative model via the first and second paths to output the first and second sCT images;
receiving the first sCT image at the input of the first discriminative model;
classifying, with the first discriminative model, the first sCT image as a synthetic or real CT image;
receiving the first and second sCT images at the input of the second generative model via the third and fourth paths to generate the first and second cycle CBCT images for calculating cycle-consistency losses;

receiving the first synthetic training CBCT image at the input of the second discriminative model;

classifying, with the second discriminative model, the first synthetic training CBCT image as a synthetic or real CBCT image;

training the first generative model to minimize or reduce a first pixel-based loss term using the second sCT image, the first pixel-based loss term representing an expectation of a difference between a plurality of sCT images and respectively paired real CT images; and training the second generative model to minimize or reduce a second pixel-based loss using the second synthetic training image, the second pixel-based loss term representing an expectation of a difference between a plurality of synthetic CBCT images and respectively paired real CBCT images.

14. A system for generating a synthetic computed tomography (sCT) image from a cone-beam computed tomography (CBCT) image, the system comprising:

processing circuitry comprising at least one processor; and a storage medium comprising instructions, which when executed by the at least one processor, cause the processor to perform operations comprising:

receiving a CBCT image of a subject;

generating, using a first generative model, a sCT image corresponding to the CBCT image, the first generative model trained based on one or more deformable offset layers in a generative adversarial network (GAN) to process the CBCT image as an input and provide the sCT image as an output, the first generative model trained in a cycle generative adversarial network (CycleGAN) comprising a second generative model, the second generative model:

receives a real computed tomography (CT) image and outputs first and second synthetic CBCT (sCBCT) images, the real CT image being paired with a training CBCT image, the first sCBCT image generated with application of a set of deformable offset layers and the second sCBCT image generated without application of the set of deformable offset layers, the first generative model to receive the first and second sCBCT images to generate first and second cycle CT images for calculating cycle-consistency losses, the first cycle CT image generated with application of the one or more deformable offset layers and the second cycle CT image generated without application of the one or more deformable offset layers; and generating a display of the sCT image for medical analysis of the subject.

15. The system of claim 14, wherein:

the one or more deformable offset layers is a first set of one or more of the deformable offset layers;

the generative adversarial network is configured to train the first generative model using a discriminative model;

values applied by the first generative model and the discriminative model are established using adversarial training between the discriminative model and the first generative model; and the first generative model and the discriminative model comprise respective convolutional neural networks;

wherein the adversarial training comprises:

training the first generative model to generate a first sCT image from a given CBCT image by applying the first set of the one or more deformable offset layers to the given CBCT image, training the first generative model to generate a second sCT image from the given CBCT image without applying the first set of the one or more deformable offset layers to the given CBCT image, and training the discriminative model to classify the first sCT image as a synthetic or a real computed tomography (CT) image, and the output of the first generative model is used for training the discriminative model and an output of the discriminative model is used for training the first generative model.

16. The system of claim 15, wherein the discriminative model is a first discriminative model, wherein the CycleGAN further comprises:

the second generative model trained to:

process a given CT image as an input;

provide a first synthetic CBCT (sCBCT) image as an output by applying a second set of the one or more deformable offset layers to the given CT image; and provide a second sCBCT image as an output without applying the second set of the one or more deformable offset layers to the given CT image; and a second discriminative model trained to classify the first synthetic sCBCT image as a synthetic or a real CBCT image.

17. The system of claim 16, wherein the CycleGAN comprises a first portion to train the first generative model, the first portion being trained to:

transmit the training CBCT image to the input of the first generative model via first and second paths to output the first and second sCT images, respectively, the first path comprising the first set of the one or more deformable offset layers and a first set of the one or more convolution layers, the second path comprising the first set of the one or more convolution layers without the first set of the one or more deformable offset layers;

receive the first sCT image at the input of the first discriminative model to classify the first sCT image as the synthetic or the real CT image; and receive the first and second sCT images at the input of the second generative model via third and fourth paths to generate first and second cycle CBCT images, respectively, for calculating cycle-consistency losses, the third path comprising the second set of the one or more deformable offset layers and the second set of the one or more convolution layers, the fourth path comprising the second set of the one or more convolution layers without the second set of the one or more deformable offset layer.

18. The system of claim 17, wherein the CycleGAN comprises a second portion that is trained to:

receive the first synthetic CBCT image at the input of the second discriminative model to classify the first synthetic CBCT image as a synthetic or real CBCT image; and.

19. The system of claim 18, wherein:

the cycle-consistency losses being generated based on a comparison of the first and second cycle CBCT images with the training CBCT image and a comparison of the first and second cycle CT images with the real CT image;

the first generative model is trained to minimize or reduce a first pixel-based loss term using the second sCT image, the first pixel-based loss term represents an expectation of difference between a plurality of synthetic CT images and respectively paired real CT images; and the second generative model is trained to minimize or reduce a second pixel-based loss term using the second sCBCT image, the second pixel-based loss term represents an expectation of difference between a plurality of synthetic CBCT images and respectively paired real CBCT images.

20. The system of claim 14, wherein the one or more deformable offset layers include at least one of one or more modules based on adversarial training to change a sampling amount, introduce coordinate offsets, and resample images using interpolation, one or more spatial transformers, one or more convolutional layers, or one or more modules configured to store deformed structure information for an image.

* * * * *

UNITED STATES PATENT AND TRADEMARK OFFICE
CERTIFICATE OF CORRECTION

| | | |
|---|---|---|
| PATENT NO. | : 12,165,287 B2 | Page 1 of 1 |
| APPLICATION NO. | : 17/594438 | |
| DATED | : December 10, 2024 | |
| INVENTOR(S) | : Jiaofeng Xu | |

It is certified that error appears in the above-identified patent and that said Letters Patent is hereby corrected as shown below:

In the Claims

In Column 42, Line 13, in Claim 1, delete "lavers" and insert --layers-- therefor In Column 42, Line 38, in Claim 3, delete "CI" and insert --CT-- therefor Signed and Sealed this
Twenty-first Day of October, 2025

John A. Squires
*Director of the United States Patent and Trademark Office*